US010032008B2

(12) United States Patent
Griffiths et al.

(10) Patent No.: US 10,032,008 B2
(45) Date of Patent: Jul. 24, 2018

(54) TRUST BROKER AUTHENTICATION METHOD FOR MOBILE DEVICES

(71) Applicant: QUALCOMM Incorporated, San Diego, CA (US)

(72) Inventors: Jonathan Charles Griffiths, Fremont, CA (US); Eliza Yingzi Du, Cupertino, CA (US); David William Burns, San Jose, CA (US); Muhammed Ibrahim Sezan, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/523,679

(22) Filed: Oct. 24, 2014

(65) Prior Publication Data

US 2015/0242601 A1      Aug. 27, 2015

Related U.S. Application Data

(60) Provisional application No. 61/943,428, filed on Feb. 23, 2014, provisional application No. 61/943,435, filed on Feb. 23, 2014.

(51) Int. Cl.
*G06F 21/30*      (2013.01)
*G06F 21/40*      (2013.01)
(Continued)

(52) U.S. Cl.
CPC ............ *G06F 21/305* (2013.01); *G06F 21/31* (2013.01); *G06F 21/40* (2013.01);
(Continued)

(58) Field of Classification Search
CPC ..... H04L 63/0861; H04L 63/08; H04L 63/10; H04L 63/105; H04L 9/3231; G06F 21/32;
(Continued)

(56) References Cited

U.S. PATENT DOCUMENTS

| 7,647,638 | B2 | 1/2010 | Furuyama |
| 7,690,032 | B1 * | 3/2010 | Peirce ..................... G06F 21/32 380/229 |

(Continued)

FOREIGN PATENT DOCUMENTS

| EP | 2254093 A1 | 11/2010 |
| WO | 2012018326 A1 | 2/2012 |

OTHER PUBLICATIONS

International Search Report and Written Opinion—PCT/US2015/016883—ISA/EPO—dated Jun. 5, 2015.
(Continued)

*Primary Examiner* — Tae K Kim
(74) *Attorney, Agent, or Firm* — Jae-Hee Choi; Hunter Clark

(57) ABSTRACT

A mobile device may perform authentication with an authenticating entity. The mobile device may comprise a plurality of sensors and a processor. The processor may be configured to: receive an authentication request from the authenticating entity requesting authentication information; and determine if the authentication request satisfies predefined user privacy preferences. If so, the processor may be configured to: retrieve the authentication information from at least one sensor to form a trust vector in response to the authentication request and to command transmission of the trust vector to the authenticating entity for authentication.

16 Claims, 12 Drawing Sheets

(51) Int. Cl.
*H04L 29/06* (2006.01)
*G06F 21/31* (2013.01)

(52) U.S. Cl.
CPC ........ *H04L 63/0861* (2013.01); *H04L 63/105* (2013.01); *G06F 2221/2133* (2013.01); *G06F 2221/2139* (2013.01)

(58) Field of Classification Search
CPC .......... G06F 21/31; G06F 21/62; G06F 21/40; G06F 2221/2113
See application file for complete search history.

(56) References Cited

U.S. PATENT DOCUMENTS

| | | | |
|---|---|---|---|
| 7,725,732 | B1 | 5/2010 | Ballard |
| 8,181,858 | B2 | 5/2012 | Carter et al. |
| 8,527,360 | B2 | 9/2013 | Groat et al. |
| 2002/0174346 | A1* | 11/2002 | Ting ........................ G06F 21/32 713/186 |
| 2010/0146262 | A1 | 6/2010 | Zhang |
| 2010/0293094 | A1 | 11/2010 | Kolkowitz et al. |
| 2012/0252411 | A1 | 10/2012 | Johnsgard et al. |
| 2013/0054433 | A1 | 2/2013 | Giard et al. |
| 2013/0055348 | A1* | 2/2013 | Strauss ................... G06F 21/31 726/3 |
| 2013/0111586 | A1 | 5/2013 | Jackson |
| 2013/0159413 | A1 | 6/2013 | Davis et al. |
| 2013/0219518 | A1 | 8/2013 | Sambamurthy et al. |
| 2013/0232552 | A1* | 9/2013 | Brush ................. G06F 21/6263 726/4 |
| 2013/0267204 | A1 | 10/2013 | Schultz et al. |
| 2013/0305312 | A1 | 11/2013 | Gomez et al. |
| 2014/0115707 | A1 | 4/2014 | Bailey, Jr. |
| 2014/0189807 | A1 | 7/2014 | Cahill et al. |
| 2014/0289833 | A1 | 9/2014 | Briceno et al. |
| 2014/0366111 | A1* | 12/2014 | Sheller ................... H04L 63/08 726/7 |
| 2015/0242605 | A1 | 8/2015 | Du et al. |
| 2016/0087957 | A1 | 3/2016 | Shah et al. |

OTHER PUBLICATIONS

International Search Report and Written Opinion—PCT/US2015/016887—ISA/EPO—dated Jul. 2, 2015.

* cited by examiner

TRUST VECTOR COMPONENTS

[TC1 | TC2 | TC3 | ... | TCn]

PRIVACY VECTOR COMPONENTS

[PC1 | PC2 | PC3 | ... | PCn]

TRUST BROKER AUTHENTICATION METHOD FOR MOBILE DEVICES

CROSS REFERENCE TO RELATED APPLICATIONS

The present application claims priority to U.S. Provisional Patent Application No. 61/943,428, filed Feb. 23, 2014, entitled "Trust Broker for Authentication Interaction with Mobile Devices," and U.S. Provisional Patent Application No. 61/943,435 filed Feb. 23, 2014, entitled "Continuous Authentication for Mobile Devices", the content of which are hereby incorporated by reference in their entirety for all purposes. The present application is also related to U.S. patent application Ser. No. 14/523,689 filed Oct. 24, 2014, entitled "Continuous Authentication with a Mobile Device".

FIELD

The present invention relates to a mobile device that negotiates or performs authentication with an authenticating entity.

RELEVANT BACKGROUND

Many service providers, services, applications or devices require authentication of users who may attempt to access services or applications remotely from, for example, a mobile device such as a smart phone, a tablet computer, a mobile health monitor, or other type of computing device. In some contexts, a service provider such as a bank, a credit card provider, a utility, a medical service provider, a vendor, a social network, a service, an application, or another participant may require verification that a user is indeed who the user claims to be. In other contexts, a service provider may merely require verification that a user is really a human person, and not an automated computer 'bot, before accepting an inquiry from the user. With a growing number of sensors on mobile devices including biometric sensors such as fingerprint sensors, pulse detectors or iris scanners, contextual sensors, location sensors, video cameras and microphones, users may wish to limit or control the quantity and type of sensor data that is shared.

Similarly, the user may wish to validate a service provider, service, application, device or another participant before engaging in a communication, sharing information, or requesting a transaction. The user may desire verification more than once in a session, and wish some control and privacy before sharing or providing certain types of personal information. Furthermore, a user may wish to negotiate with a service, an application, or another participant before transmitting requested personal information.

SUMMARY

Aspects of the invention may relate to a mobile device that performs authentication with an authenticating entity. The mobile device may comprise a plurality of sensors and a processor. The processor may be configured to: receive an authentication request from the authenticating entity requesting authentication information; and determine if the authentication request satisfies predefined user privacy preferences. If so, the processor may be configured to: retrieve the authentication information from at least one sensor to form a trust vector in response to the authentication request and to command transmission of the trust vector to the authenticating entity for authentication.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

As used herein, the term "mobile device" refers to any form of programmable computer device including but not limited to laptop computers, tablet computers, smartphones, televisions, desktop computers, home appliances, cellular telephones, personal television devices, personal data assistants (PDA's), palm-top computers, wireless electronic mail receivers, multimedia Internet enabled cellular telephones, Global Positioning System (GPS) receivers, wireless gaming controllers, receivers within vehicles (e.g., automobiles), interactive game devices, notebooks, smartbooks, netbooks, mobile television devices, mobile health devices, smart wearable devices, or any computing device or data processing apparatus. An "authenticating entity" refers to a service provider, a service, an application, a device, a social network, another user or participant, or any entity that may request or require authentication of a mobile device or a user of a mobile device.

Figure 1:
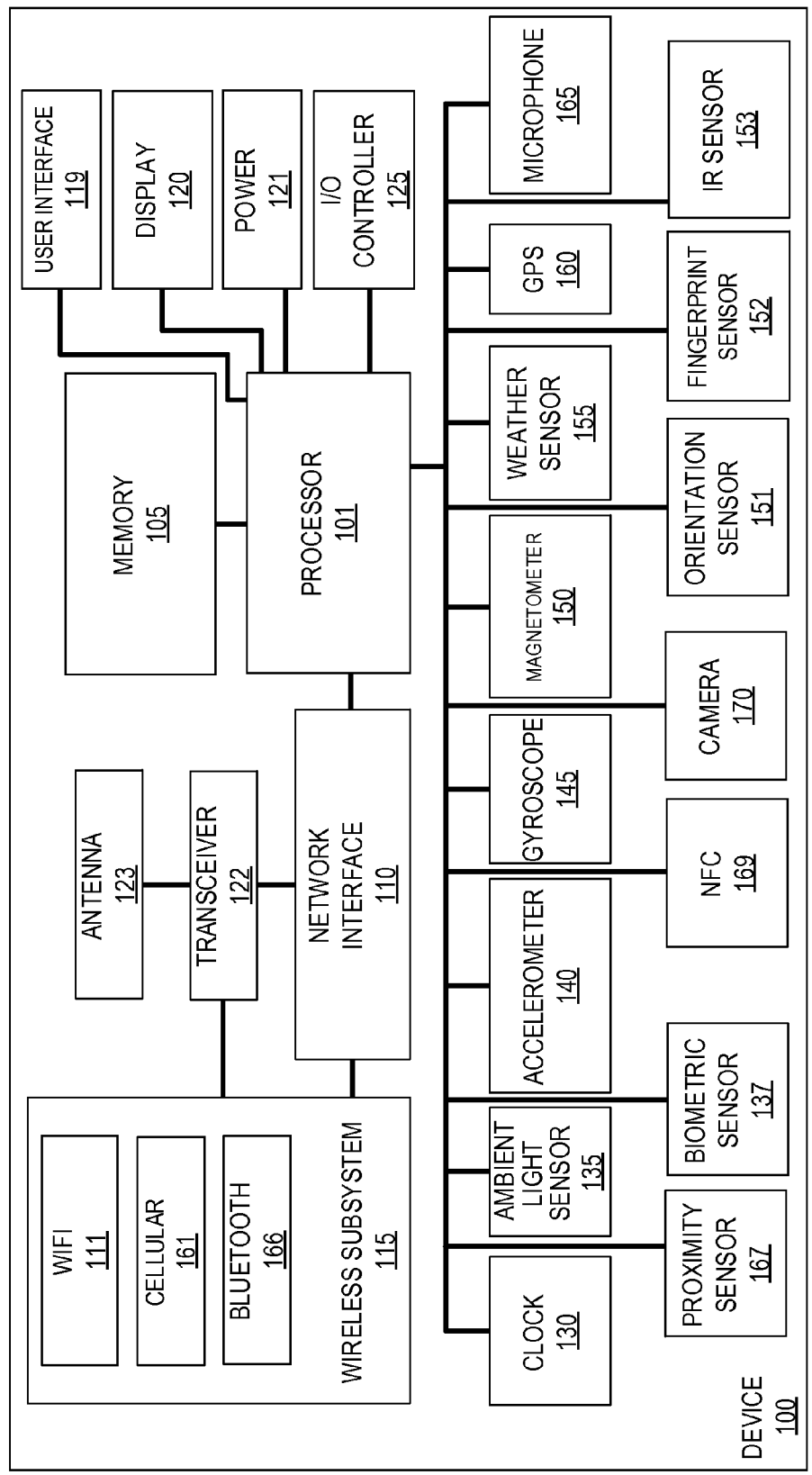
FIG. 1 is a block diagram of a mobile device in which aspects of the invention may be practiced.

FIG. 1 is block diagram illustrating an exemplary device in which embodiments of the invention may be practiced. The system may be a computing device (e.g., a mobile device 100), which may include one or more processors 101, a memory 105, an I/O controller 125, and a network interface 110. Mobile device 100 may also include a number of sensors coupled to one or more buses or signal lines further coupled to the processor 101. It should be appreciated that mobile device 100 may also include a display 120 (e.g., a touch screen display), a user interface 119 (e.g., keyboard, touch screen, or similar devices), a power device 121 (e.g., a battery), as well as other components typically associated with electronic devices. In some embodiments, mobile device 100 may be a transportable device, however, it should be appreciated that device 100 may be any type of computing device that is mobile or non-mobile (e.g., fixed at a particular location).

Mobile device 100 may include a set of one or more biometric sensors and/or non-biometric sensors. Mobile device 100 may include sensors such as a clock 130, ambient light sensor (ALS) 135, biometric sensor 137 (e.g., heart rate monitor, electrocardiogram (ECG) sensor, blood pressure monitor, etc., which may include other sensors such as a fingerprint sensor, camera or microphone that may provide biometric information), accelerometer 140, gyroscope 145, magnetometer 150, orientation sensor 151, fingerprint sensor 152, weather sensor 155 (e.g., temperature, wind, humidity, barometric pressure, etc.), Global Positioning Sensor (GPS) 160, infrared (IR) sensor 153, proximity sensor 167, and near field communication (NFC) sensor 169. Further, sensors/devices may include a microphone (e.g. voice sensor) 165 and camera 170. Communication components may include a wireless subsystem 115 (e.g., Bluetooth 166, Wi-Fi 111, or cellular 161), which may also be considered sensors that are used to determine the location (e.g., position) of the device. In some embodiments, multiple cameras are integrated or accessible to the device. For example, a mobile device may have at least a front and rear mounted camera. The cameras may have still or video capturing capability. In some embodiments, other sensors may also have multiple installations or versions.

Memory 105 may be coupled to processor 101 to store instructions for execution by processor 101. In some embodiments, memory 105 is non-transitory. Memory 105 may also store one or more models, modules, or engines to implement embodiments described below that are implemented by processor 101. Memory 105 may also store data from integrated or external sensors.

Mobile device 100 may include one or more antenna(s) 123 and transceiver(s) 122. The transceiver 122 may be configured to communicate bidirectionally, via the antenna(s) and/or one or more wired or wireless links, with one or more networks, in cooperation with network interface 110 and wireless subsystem 115. Network interface 110 may be coupled to a number of wireless subsystems 115 (e.g., Bluetooth 166, Wi-Fi 111, cellular 161, or other networks) to transmit and receive data streams through a wireless link to/from a wireless network, or may be a wired interface for direct connection to networks (e.g., the Internet, Ethernet, or other wireless systems). Mobile device 100 may include one or more local area network transceivers connected to one or more antennas. The local area network transceiver comprises suitable devices, hardware, and/or software for communicating with and/or detecting signals to/from wireless access points (WAPs), and/or directly with other wireless devices within a network. In one aspect, the local area network transceiver may comprise a Wi-Fi (802.11x) communication system suitable for communicating with one or more wireless access points.

Mobile device 100 may also include one or more wide area network transceiver(s) that may be connected to one or more antennas. The wide area network transceiver comprises suitable devices, hardware, and/or software for communicating with and/or detecting signals to/from other wireless devices within a network. In one aspect, the wide area network transceiver may comprise a CDMA communication system suitable for communicating with a CDMA network of wireless base stations; however in other aspects, the wireless communication system may comprise another type of cellular telephony network or femtocells, such as, for example, TDMA, LTE, Advanced LTE, WCDMA, UMTS, 4G, or GSM. Additionally, any other type of wireless networking technologies may be used, for example, WiMax (802.16), Ultra Wide Band (UWB), ZigBee, wireless USB, etc. In conventional digital cellular networks, position location capability can be provided by various time and/or phase measurement techniques. For example, in CDMA networks, one position determination approach used is Advanced Forward Link Trilateration (AFLT).

Thus, device 100 may be a mobile device, wireless device, cellular phone, personal digital assistant, mobile computer, wearable device (e.g., head mounted display, wrist watch, virtual reality glasses, etc.), internet appliance, gaming console, digital video recorder, e-reader, robot navigation system, tablet, personal computer, laptop computer, tablet computer, or any type of device that has processing capabilities. As used herein, a mobile device may be any portable, movable device or machine that is configurable to acquire wireless signals transmitted from and transmit wireless signals to one or more wireless communication devices or networks. Thus, by way of example but not limitation, mobile device 100 may include a radio device, a cellular telephone device, a computing device, a personal communication system device, or other like movable wireless communication equipped device, appliance, or machine. The term "mobile device" is also intended to include devices which communicate with a personal navigation device, such as by short-range wireless, infrared, wire line connection, or other connection—regardless of whether satellite signal reception, assistance data reception, and/or position-related processing occurs at the device 100. Also, "mobile device" is intended to include all devices, including wireless communication devices, computers, laptops, etc., which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile device."

It should be appreciated that embodiments of the invention as will be hereinafter described may be implemented through the execution of instructions, for example as stored in the memory 105 or other element, by processor 101 of mobile device 100 and/or other circuitry of device 100 and/or other devices. Particularly, circuitry of the device 100, including but not limited to processor 101, may operate under the control of a program, routine, or the execution of instructions to execute methods or processes in accordance with embodiments of the invention. For example, such a program may be implemented in firmware or software (e.g. stored in memory 105 and/or other locations) and may be implemented by processors, such as processor 101, and/or other circuitry of device. Further, it should be appreciated that the terms processor, microprocessor, circuitry, controller, etc., may refer to any type of logic or circuitry capable of executing logic, commands, instructions, software, firmware, functionality and the like. The functions of each unit or module within the mobile device 100 may also be implemented, in whole or in part, with instructions embodied in a memory, formatted to be executed by one or more general or application-specific processors.

Various terminologies will be described to aid in the understanding of aspects of the invention. Sensor inputs may refer to any input from any of the previously described sensors, e.g. a clock 130, ambient light sensor (ALS) 135, biometric sensor 137 (e.g., heart rate monitor, blood pressure monitor, etc.), accelerometer 140, gyroscope 145, magnetometer 150, orientation sensor 151, fingerprint sensor 152, weather sensor 155 (e.g., temperature, wind, humidity, barometric pressure, etc.), Global Positioning Sensor (GPS) 160, infrared (IR) sensor 153, microphone 165, proximity sensor 167, near field communication (NFC) sensor 169, or camera 170. In particular, some of the sensor inputs may be referred to as "biometric" sensor inputs or biometric sensor information from biometric sensors, which may include a biometric sensor 137 (e.g., heart rate inputs, blood pressure inputs, etc.), fingerprint sensor 152 (e.g., fingerprint input), touch screen 120 (e.g., finger scan or touch input), touch screen 120 (e.g., hand or finger geometry input), pressure or force sensors (e.g., hand or finger geometry), microphone 165 (e.g., voice scan), camera 170 (e.g., facial or iris scan), etc. It should be appreciated these are just examples of biometric sensor inputs and biometric sensors and that a wide variety of additional sensor inputs may be utilized. Further, other types of sensors may provide other types of inputs generally referred to herein as "non-biometric" sensor inputs/data or just sensor inputs/data (e.g., general sensors). One example of these generalized sensor inputs may be referred to as contextual inputs that provide data related to the current environment that the mobile device 100 is currently in. Therefore, a contextual sensor may be considered to be any type of sensor or combination of sensors that relate to the current context, condition or situation of the mobile device that may relate to contextual sensing information such as light, acceleration, orientation, weather, ambient pressure, ambient temperature, ambient light level, ambient light characteristics such as color constituency, location, proximity, ambient sounds, identifiable indoor and outdoor features, home or office location, activity level, activity type, presence of others, etc. Accordingly, examples of contextual sensors may include ambient light sensor 135, accelerometer 140, weather sensor 155, orientation sensor 151, GPS 160, proximity sensor 167, microphone 165, camera 170, etc. These merely being examples of contextual inputs and contextual sensors. In some implementations, biometric information and contextual information may be extracted from the same sensor such as a single camera or microphone. In some implementations, biometric information and contextual information may be extracted from the same set of sensor data. In some implementations, biometric and contextual information may be extracted from different sensors. In some implementations, biometric and contextual information may be extracted from different sensor data acquired from the same sensor or from a set of sensors. Additionally, data input may refer to user-inputted data for authentication (e.g., names, IDs, passwords, PINs, etc.) or any other data of interest for authentication. It should be noted that in some embodiments biometric sensor information may include raw sensor data or input from one or more biometric sensors, while in other embodiments the biometric sensor information may include only processed data such as fingerprint template information having positions and orientations of various minutiae associated with the fingerprint that allows subsequent recognition of the user yet does not allow recreation of the fingerprint image. In some embodiments, biometric sensor information may allow the authenticating entity to identify the user, while in other embodiments the matching or authentication is performed locally in a secure environment within the mobile device and only a verification output or an output of an authentication system such as an authentication level or an authentication score is provided to the authenticating entity. It should be noted that a sensor scan, such as a fingerprint, iris, voice or retina scan, does not imply a particular method or technique of acquiring sensor data, but rather is intended to more broadly cover any method or technique of acquiring sensor input. More generally, "sensor information" as used herein may include raw sensor data, processed sensor data, information or features received, extracted or otherwise retrieved from sensor data, information about the type or status of the sensor, aggregated sensor data, aggregated sensor information, or other type of sensor information. Similarly, "sensor data" may refer to raw sensor data, sensor input, sensor output, processed sensor data, or other sensor information.

In one embodiment of the invention, a trust broker (TB) may utilize multiple inputs from various biometric sensors, contextual sensors and user data input (e.g., names, IDs, passwords, PINs, etc.) to manage a two-way interaction between mobile device 100 and an authenticating entity. The TB may provide the primary authentication interface between the mobile device 100 and the authenticating entity to which the user wishes to be authenticated with. The TB may extract and provision the credentials with an underlying mechanism to provide them. For example, a TB may generate a trust coefficient (TC) and/or a composite trust score that may be provided to the authenticating entity. The trust coefficients, trust scores, results of authentications performed by the mobile device using an authentication system and/or other sensor data, sensor information or data input may be included in one or more fields of a trust vector (TV) that may be provided to the authenticating entity. Moreover, the TB may control or otherwise interact with one or more sensors associated with the mobile device 100, as previously described. For example, the sensors may include cameras 170, microphones 165, fingerprint sensors 152, or other biometric, environmental or contextual sensors associated with the mobile device 100. Environmental sensors may include, for example, sensors for determining location, position, orientation, altitude, ambient temperature, ambient pressure, ambient light level, wind speed, and/or humidity, cameras for viewing the immediate surroundings of the mobile device, and microphones for detecting sounds in the vicinity of the mobile device.

In some embodiments, the TB may maintain user privacy and personal data security. These arrangements may be customized according to user security/privacy preferences and/or user security/privacy settings for any particular authenticating entity, or for any particular class of authenticating entities. For example, the TB, responsive to user-established or user-approved preferences, may be configured to reveal personal information such as personal identity only to authenticating entities that the user trusts and to reveal to such authenticating entities only what is necessary, for example, to complete a particular user-desired transaction with a particular authenticating entity. Also, the TB may provide a mechanism to manage local (e.g. mobile device 100) security/privacy preferences—such as limiting keypad entry once a TC or other authentication score drops below a given value. The TB may be used for multiple and/or continuous authentication methods that are in use. For example, in some embodiments, the TB may be used in conjunction with continuous authentication methods. However, the TB may also function with single fixed (one-time)

user authentication methods (e.g., user name/password) utilizing a subset of the functionality to be hereinafter described. For example, in some embodiments, the TB may utilize one or more sensor inputs to achieve authentication. In multi-factor authentication, a plurality of authentication inputs may be provided or otherwise combined for authentication.

Embodiments of the invention may relate to an apparatus and method to perform authentication with an authenticating entity that the user wishes to authenticate with, based upon user data input (e.g., username, password, etc.) and/or inputs from a plurality of biometric, environmental or contextual sensors, which may be transmitted to the authenticating entity, if the user has authorized that that type of information is acceptable for authentication purposes for that particular type of authenticating entity. In particular, as will be described hereinafter, mobile device 100, under the control of processor 101, may implement this methodology to be hereinafter described. In some implementations, data from one or more sensors may be sent directly to the authenticating entity for authentication, while in alternative implementations the data from the sensors may be used (with local authentication) to release one or more credentials for remote authentication, such as encryption keys, a username/password, or a digital certificate.

Figure 2:
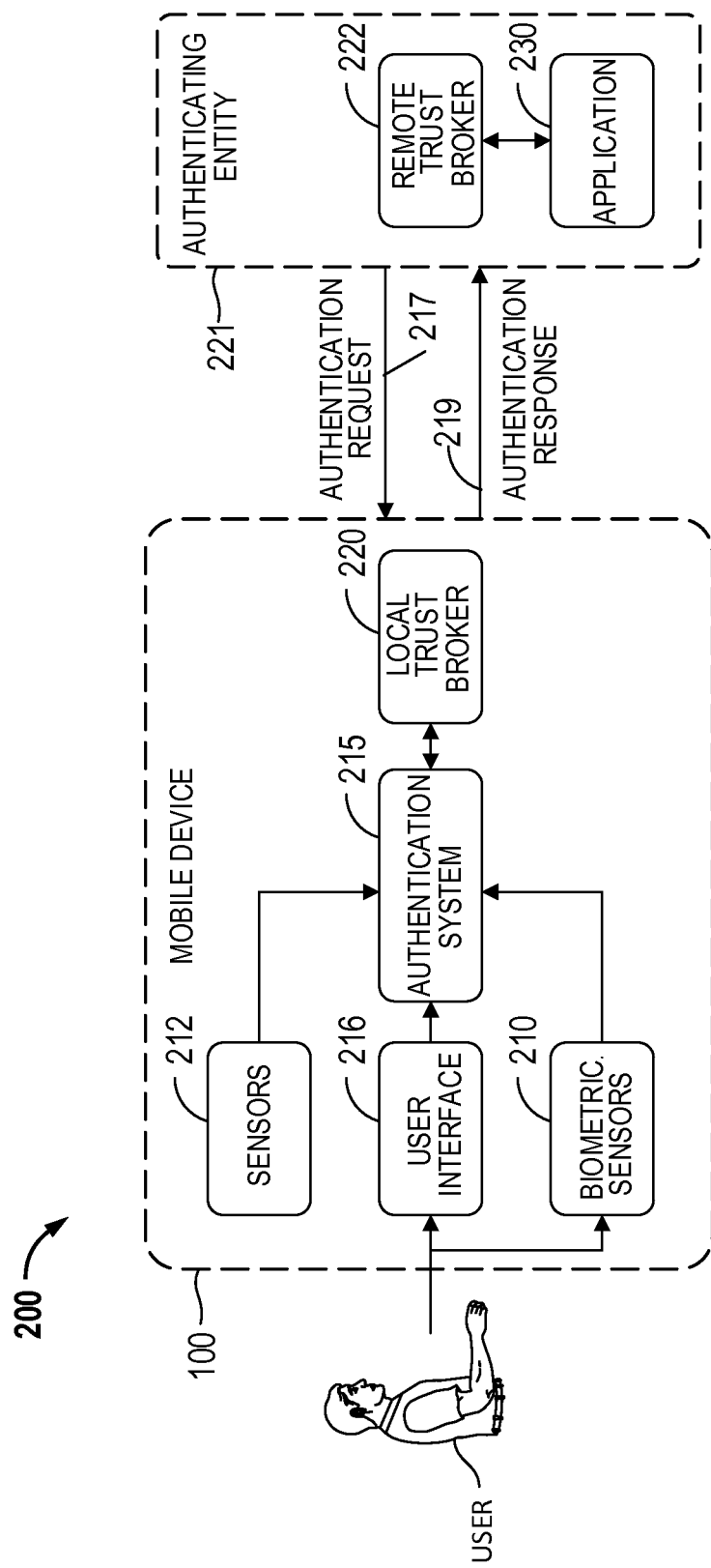
FIG. 2 is a diagram of a mobile device performing authentication with an authenticating entity.

With additional reference to FIG. 2, a system 200 is shown in which mobile device 100 may perform authentication with an authenticating entity 221. In particular, mobile device 100 may include a plurality of sensors. As examples, these sensors may include particular biometric sensors 210, as previously described, as well as a plurality of other sensors 212 such as environmental sensors or contextual sensors, as previously described. Further, mobile device 100, via processor 101, may be configured to implement an authentication system 215 and a local trust broker 220 to implement a plurality of functions. These functions may include receiving an authentication request 217 from the authenticating entity 221 that may request one or more of sensor data, biometric sensor information, user data input, or other authentication information. Further, local trust broker 220 may determine whether the authentication request 217 matches, fulfills, is consistent with or otherwise satisfies predefined user security/privacy preferences. If so, local trust broker 220, operating in cooperation with authentication system 215, may retrieve, extract or otherwise receive the sensor data from the sensors 212 or the biometric sensors 210, or an output of the authentication system 215, or other input data such as data input from the user (e.g., via user interface 216—e.g., usernames, passwords, etc.) to form a trust vector that matches or satisfies the authentication request 217. Based upon this, local trust broker 220 may transmit the trust vector as an authentication response 219 to the authenticating entity 221 for authentication with the authenticating entity. Forming the trust vector may include creating, updating, adjusting, or otherwise producing a trust vector suitable for responding to the authentication request 217. In some implementations, the trust broker may assemble raw sensor data or an output of an authentication system into appropriate fields in the trust vector. In some implementations, the trust broker may make a decision to release credentials or specific sensor information (raw or processed) based on the sensor data, an output of the authentication system, user security/privacy preferences and settings, preferences of the authenticating entity (e.g. a service provider), and prior exchanges of TV and PV information. Trust vectors and privacy vectors are described in more detail with respect to FIG. 7 below.

It should be appreciated that local trust broker 220 and authentication system 215 may be implemented under the control of processor 101 of the mobile device 100. Further, authenticating entity 221 may include a remote trust broker 222 that operates in conjunction with an application 230 to interface with mobile device 100. As examples, authenticating entity 221 and associated applications 230 may relate to such services as, for example: bank functions, utility functions, medical service provider functions, vendor functions, social network functions, requests from other users, etc. These types of authenticating entities may require some sort of verification. As an example, system 200 may include a mobile device 100 and an authenticating entity 221 that implements one or more applications 230. As previously described, mobile device 100 may be a smart phone, tablet computer, mobile health monitor, or other mobile electronic device. Alternatively, device 100 may be a fixed (non-mobile) location such as a personal computer, electronic kiosk, etc. Further, applications 230 implemented by authenticating entities may include Internet websites related to electronic commerce, banking, electronic payment processes, medical or financial services or social networking, cloud-based services, or applications running on another mobile device.

On the other hand, if the authentication request 217 does not match or satisfy the predefined user security/privacy preferences, local trust broker 220 may transmit a privacy vector to the authenticating entity 221 that includes predefined user security/privacy preferences such as types of user-approved sensor data, biometric sensor information, user data input or authentication information that the user approves of or is otherwise available. These types of authentication messages, authentication requests and authentication responses in the form of privacy vectors and trust vectors will be described in more detail hereinafter. In particular, local trust broker 220 may negotiate with the remote trust broker 222 of the authenticating entity 221 to determine a trust vector (e.g. authentication response 219) that satisfies the predefined user security/privacy preferences such that a suitable authentication response 219 that satisfies the authentication requirements of the authenticating entity 221 may be transmitted to the authenticating entity 221 to authenticate mobile device 100. As will be described in more detail hereinafter, the trust vector may comprise a multi-field data message that may include one or more of sensor data, biometric sensor information, data input, a sensor data score, a biometric sensor information score, a data input score, a trust coefficient, a trust score, a credential, an authentication coefficient, an authentication score, an authentication level, an output of an authentication system, or authentication information to match or at least satisfy the authentication request 217. Sensor data scores, biometric sensor information scores, and data input scores may include one or more trust scores or trust coefficients as described below. Thus, the local trust broker 220 may negotiate with the remote trust broker 222 to determine a suitable trust vector for an authentication response 219 to satisfy both the user predefined security/privacy preferences and the authentication requirements of the authenticating entity 221. The local trust broker 222 may determine one or more sensor data scores, biometric sensor information scores, or data input scores for inclusion in the trust vector. As one example, as will be described in more detail hereinafter, the local trust broker 220 of the mobile device 100 may particularly determine sensor data scores from sensors 212 and biometric sensor data scores from biometric sensors 210 as well as collect user data input from user interfaces 216, and by utilizing authentication system 215 may accumulate this data for the formation of a suitable trust vector for the authentication response 219. In some implementations, biometric sensor information from one or more biometric sensors and/or other sensor input may be selected based on a level of authentication required by the remote trust broker 222. For example, a high level of authentication may require input from a variety of sensors, whereas a low level of authentication may require very little if any input from the sensors.

As examples of various terms, a trust coefficient (TC) may be a level of trust based upon a composition of one or more inputs, such as user data inputs (e.g., username, password, etc.), sensor inputs (e.g., GPS location input, acceleration input, etc.), biometric sensor inputs (e.g., fingerprint scan from a fingerprint sensor, facial or iris scan from a camera, voiceprint, etc.), or an output of an authentication system. A trust coefficient may be a composition of one or more data inputs. Each of these inputs may be given scores. In some implementations, the sensor inputs may be given scores to indicate their authentication strength, allowing a composite TC to be generated based on weighted sensor inputs. An authenticating entity 221 may set a risk coefficient (RC) or a minimum trust coefficient, score or level that needs to be met to allow for authentication of a mobile device 100. Therefore, the remote trust broker 222 of the authenticating entity 221 may determine whether a mobile device 100 has provided enough information (e.g., through the authentication response 219) to generate a TC that is greater than the RC such that the authenticating entity 221 authenticates the mobile device 100. In particular, after negotiation between the authenticating entity 221 and mobile device 100, a suitable trust vector may be determined that includes one or more user data input, sensor data scores, biometric sensor information scores, user data input scores, or other authentication information that may be transmitted to the authenticating entity 221. If based upon this trust vector, the remote trust broker 222 of the authenticating entity 221 determines that the TC is greater than the RC, the authenticating entity 212 may authenticate the mobile device 100.

Looking at sensor features of the mobile device 100 that may be utilized for authentication, mobile device 100 may include a user interface 216, biometric sensors 210, and other sensors 212. For example user interface 216 may include a keyboard, a mouse, and a touch pad or touch screen, all of which may be utilized for input/output (I/O) between the mobile device 100 and the user. User interface 216 may be configured to accept user authentication data such as, for example, a user name, a personal identification number (PIN), a password, etc. A biometric sensor 212 may be configured to generate or provide user biometric data, for example, a fingerprint scan, a voice scan, an iris scan, a retinal scan, a digital scan, etc. Accordingly, biometric sensor inputs from biometric sensors 210 may include a biometric sensor 137 (e.g., heart rate inputs, blood pressure inputs, etc.), fingerprint sensor 152 (e.g., fingerprint), touch screen 120 (e.g., finger scan, hand geometry, etc.), pressure sensors (hand or finger geometry), microphone 165 (e.g. voice scan), camera 170 (facial or iris scan), etc. It should be appreciated that a wide variety of biometric sensor inputs may be utilized. Further, other types of sensors 212 (e.g. non-biometric sensors) may also be used for authentication purposes. These types of sensors may be related to such sensing information as light, acceleration, orientation, weather, location, context, proximity, sound, etc. Accordingly, examples of these types of sensors 212 may include ambient light sensor 135, accelerometer 140, weather sensor 155, orientation sensor 150, GPS 160, proximity sensor 167, microphone 165, etc.

The authentication system 215 may collect various user data input information, sensor data, sensor information and authentication information for use by the local trust broker 220. Therefore, the outputs from the user interface 216, biometric sensors 210, and sensors 212 may be processed by authentication system 215 for use by local trust broker 220, which may also score this information (e.g., based upon quality or other features), and may form a trust vector for transmission as an authentication response 219 to the authenticating entity 221. In particular, using data received from the user interface 216, biometric sensors 210 and sensors 212, authentication system 215 and local trust broker 220 may compute and periodically, quasi-continuously or continuously update one or more components of a trust vector. The "trust vector" or "TV", as the term is used herein, may be a multi-field/multi-parameter message or data stream that may include delivery-specific authentication information and credentials for use as an authentication response 219 to the authenticating entity 221. For example, the TV may include one or more parameters or authentication information related to session information, user name, password, time/date stamps, biometric data or information, geophysical location data, and site-specific credentials. Mobile device 100 having an authentication system 215 and local trust vector 220 may be configured such that mobile device 100 may receive authentication requests 217 from an authenticating entity 221 and may transmit authentication responses 219 to the authenticating entity 221 via the local trust broker 220. In this way, the local trust broker 220 may utilize multiple sources of authentication information outputted from the authentication system 215 based upon user interface inputs, sensor data, and biometric sensor information to support and regulate interactions between the mobile device 100 and the application 230 of the authenticating entity 221. In some implementations, the authentication system 215 may perform a matching function based on the biometric data, allowing a score representing the match, i.e., a biometric sensor information score, or a quality of the match to be passed to the local trust broker 220 rather than passing raw biometric sensor data. The local trust broker 220 may abstract the sensor data before transmission to the authenticating entity 221. For example, the local trust broker 220 may score the incoming biometric sensor information and sensor data, placing a high trust score on a fingerprint match and a relatively lower trust score on a voice match.

As an example, local trust broker (TB) 220 may respond to an authentication request 217 received from authenticating entity 221. In one embodiment, the authentication request 217 is generated by a remote TB 222 of authenticating entity 221 and is associated with an application 230. In response to the authentication request 217, local TB 220 may generate an authentication response 219 that includes a trust vector (TV) and may forward the TV, as the authentication response 219, to application 230 at authenticating entity 221. In some embodiments, local TB 220 may respond to authentication request 217 only with those portions of the TV that are both required by the application 230 and authorized by the user (i.e. matches, fulfills, is consistent with or otherwise satisfies the predefined user security/privacy preferences). In this instance, the TV sent as the authentication response 219 to the application 230 of authenticating entity 221 matches or satisfies the predefined user security/privacy preferences and may include some or all of the authentication information requested by the authenticating entity 221 in the authentication request 217.

It should be appreciated that the local TB 220 may continuously or quasi-continuously update the TV for transmission to the authenticating entity 221 as an authentication response 219 to provide continuous authentication. In some implementations, the local TB 220 may transmit the TV on a continuous, quasi-continuous or periodic basis that may be established between the mobile device 100 and the authenticating entity 221. In some implementations, the local TB 220 may update one or more components of the trust vector on a continuous basis, and transmit the updated trust vector only when requested by the authenticating entity or when a component of the trust vector falls or degrades below a threshold value. It should be appreciated that local TB 220 may be integral to the mobile device 100 or may be external to the mobile device 100. For example, in some embodiments, at least some portions of the trust broker may be disposed at a third-party server or be "cloud-based".

Figure 3:
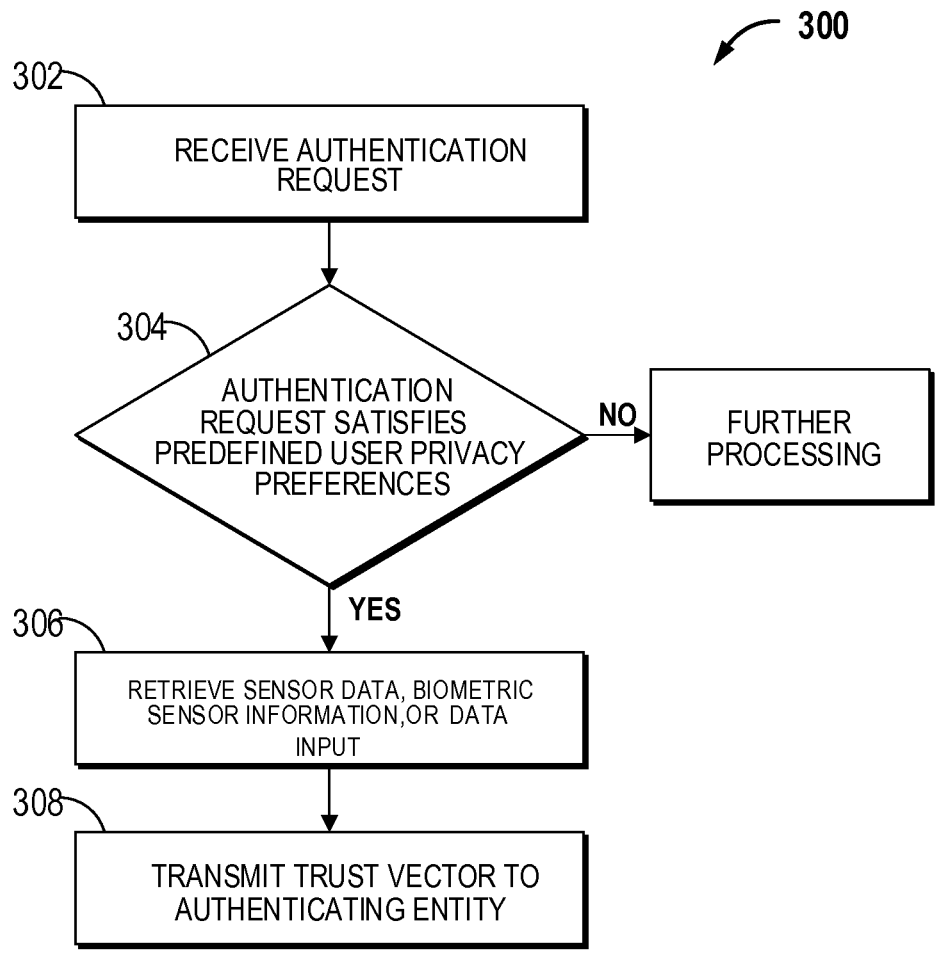
FIG. 3 is a flow diagram illustrating a process to perform an authentication process.

With brief additional reference to FIG. 3, in one embodiment, a process 300 is implemented in which a mobile device receives an authentication request from an authenticating entity requesting one or more of sensor data, biometric sensor information, user data input, or other authentication information (block 302). Next, the mobile device may determine if the authentication request matches, fulfills, is consistent with or otherwise satisfies predefined user security/privacy preferences (decision block 304). If not, further processing occurs. If so, the mobile device may retrieve the sensor data from one or more sensors, the biometric sensor information from one or more biometric sensors, the data input (e.g. user input data) or the authentication information to form one or more components of a trust vector that matches or satisfies the authentication request (block 306). The mobile device may then transmit the trust vector to the authenticating entity for authentication with the authenticating entity (block 308). In some implementations, the authentication information may be transmitted or otherwise sent to the authenticating entity continuously, quasi-continuously, periodically, or upon request by the authenticating entity. In some implementations, the authentication information may be transmitted when a component level or value falls below a predetermined threshold level or value. One or more components of the trust vector may be continuously updated within the mobile device to provide continuous authentication. The updated trust vector with the updated authentication information may be sent or otherwise transmitted to the authenticating entity, for example, in a continuous, quasi-continuous or periodic manner, upon request by the authenticating entity, or when one or more components of the trust vector fall below a predetermined threshold level or value.

Figure 4:
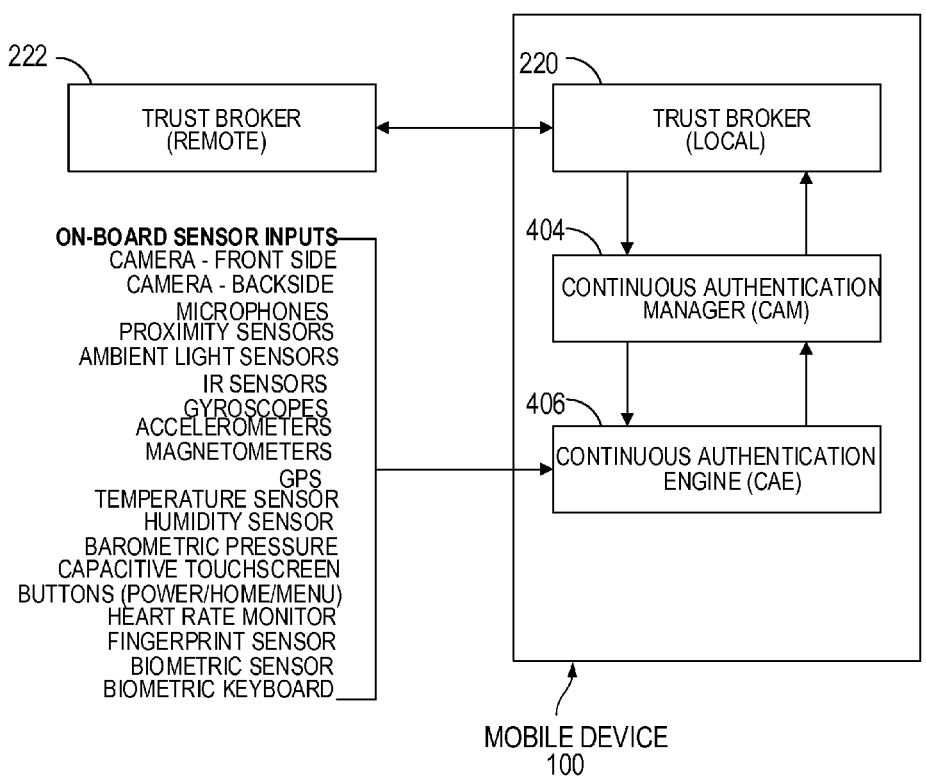
FIG. 4 is a diagram illustrating a local trust broker, a continuous authentication manager, and a continuous authentication engine.

Particular examples of trust vectors (TVs), privacy vectors (PVs), and other components for use in authentication requests 217 and authentication responses 219 for authentication with the authenticating entity 221 will be described in detail hereinafter. In particular, examples of implementations of the embodiments of the invention will be hereinafter described. With additional reference to FIG. 4, in one embodiment, mobile device 100 may include a continuous authentication engine 406 that is coupled to a continuous authentication manager 404, both of which perform as an authentication system 215 previously described, and are coupled to the local TB 220. With this implementation, the local TB 220 may communicate with the remote TB 222 of the authenticating entity 221, as previously described. As one example, the continuous authentication manager 404 may consolidate on-device authentication functions such as interaction with the continuous authentication engine 406, and may interact with application program interfaces (APIs) on the mobile device 100 for authentication-related functions. In some implementations, the local TB 220 may be configured to maintain user security/privacy preferences that are used to filter the data offered by the local TB 220 in external authentication interactions with the remote TB 222 of the authenticating entity 221.

As one example, local TB 220 may interact with the remote TB 222, manage user credentials (e.g. user names, PINs, digital certificates, etc.), determine what types of credentials or information (e.g., user data input, sensor data, biometric sensor information, etc.) are to be released to the remote TB 222 of the authenticating entity (e.g., based on privacy vector information and negotiations with the remote TB 222), assemble and send trust and privacy vectors (TVs and PVs), manage user security/privacy settings and preferences, and/or interface with the continuous authentication manager 404.

In one embodiment, the continuous authentication manager 404 may perform functions including interacting with the local TB 220, controlling how and when trust scores for the trust vectors (TVs) are calculated, requesting specific information from the continuous authentication engine 406 when needed (e.g., as requested by the local trust broker 220), providing output to APIs of the mobile device 101 (e.g., device-level trust controls, keyboard locks, unauthorized use, etc.), and/or managing continuous authentication engine 406 (e.g., issuing instructions to or requesting actions from the continuous authentication engine to update trust scores and/or check sensor integrity when trust scores fall below a threshold value, etc.). In some implementations, the local trust broker 220 may determine, in cooperation with the continuous authentication manager 404 and the continuous authentication engine 406, one or more sensor data, biometric sensor information, data input, sensor data scores, biometric sensor information scores, data input scores, trust coefficients, trust scores, credentials, authentication coefficients, authentication scores, authentication levels, authentication system outputs, or authentication information for inclusion in the trust vector.

In one embodiment, the continuous authentication engine 406 may perform one or more functions including responding to the continuous authentication manager 404; generating trust vector (TV) components; calculating TV scores, values or levels; providing raw data, template data or model data when requested; generating or conveying conventional authenticators (e.g., face, iris, fingerprint, ear, voice, multimodal biometrics, etc.), times/dates, hard biometric authenticators, soft biometric authenticators, hard geophysical authenticators, or soft geophysical authenticators; and accounting for trust-level decay parameters. Hard biometric authenticators may include largely unique identifiers of an individual such as fingerprints, facial features, iris scans, retinal scans or voiceprints, whereas soft biometric authenticators may include less unique factors such as persisting behavioral and contextual aspects, regular behavior patterns, face position with respect to a camera on a mobile device, gait analysis, or liveness. Thus, in one embodiment, the continuous authentication engine 406 may calculate TV scores based upon TV components that are based upon data inputs from one or more non-biometric sensors 212, biometric sensors 210, user data input from a user interface 216, or other authentication information as previously described. As previously described, there is a wide variety of different types of sensors that may provide this type of sensor data such as one or more cameras (front side and/or backside), microphones, proximity sensors, light sensors, IR sensors, gyroscopes, accelerometers, magnetometers, GPS, temperature sensors, humidity sensors, barometric pressure sensors, capacitive touch screens, buttons (power/home/menu), heart rate monitors, ECG sensors, fingerprint sensors, biometric sensors, biometric keyboards, etc. A wide variety of these different types of sensors has been described in detail previously, and are well known to those skilled in the art.

Further, it should be appreciated that by utilizing the continuous authentication manager 404 and the continuous authentication engine 406 in cooperation with local TB 220, local TB 220 may periodically, continuously or quasi-continuously update one or more components of the TV in the authentication response to the remote TB 222 of the authenticating entity to allow for continuous authentication of the mobile device 100 with the authenticating entity.

Figure 5:
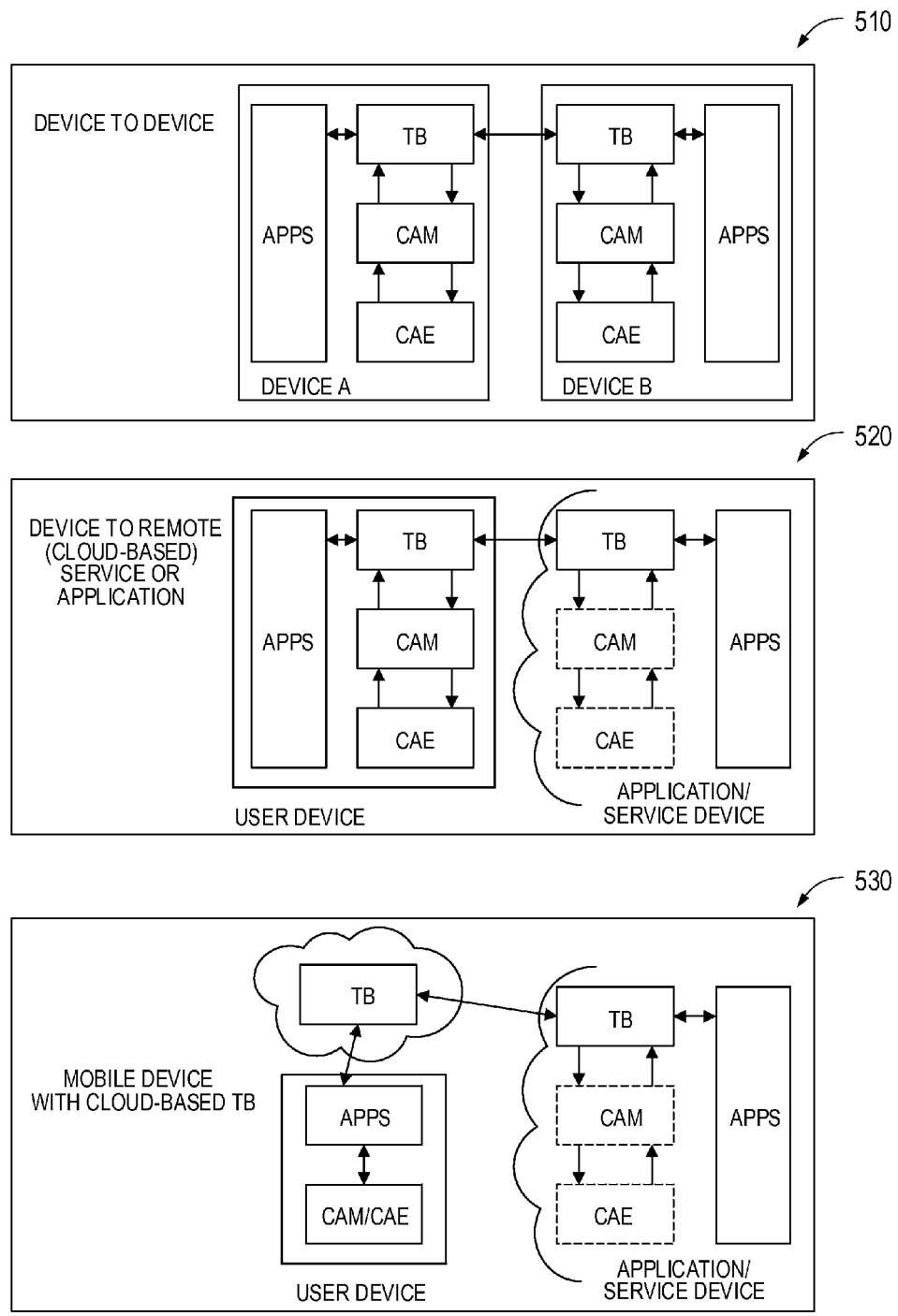
FIG. 5 is a diagram illustrating a variety of different implementations of the trust broker.

With additional reference to FIG. 5, a variety of different implementations of the trust broker may be configured to support one or more of the following types of trust-broker interactions. For example, with reference to trust-broker interaction 510, each device (e.g., Device A—mobile and Device B—authenticating entity such as another mobile device, e.g., peer-to-peer) may include a trust broker that interacts with a continuous authentication manager (CAM) and a continuous authentication engine (CAE) on each device. In another example, a trust-broker interaction 520 conveys an interaction between a user device and a remote (cloud-based) service or application. Both sides include a trust broker; the continuous authentication manager function and the continuous authentication engine function are enabled on the user device side, but are optional on the service/application device side. The continuous authentication engine and continuous authentication manager may be used on the application/service device side to configure the remote trust broker or to provide the ability for the user device to authenticate the application/service device. In yet another example, a cloud-based trust-broker interaction 530 may be utilized. In this example, the trust broker associated with a mobile device may be located partially or completely away from the mobile device, such as on a remote server. The trust-broker interaction with the continuous authentication manager and/or continuous authentication engine of the user device may be maintained over a secure interface. The continuous authentication manager function and the continuous authentication engine function may be optional on the application/service device side.

Figures 6, 7:
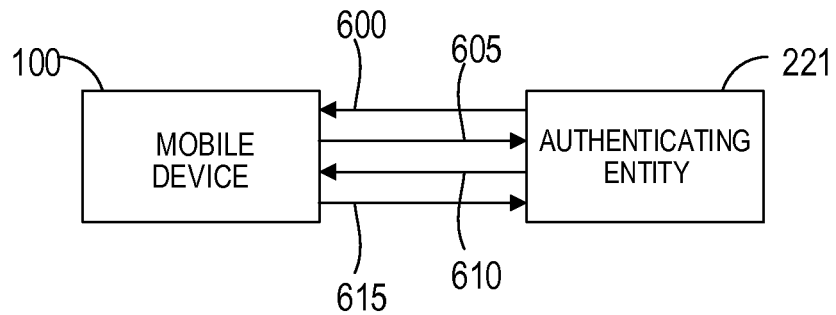
FIG. 6 is a diagram illustrating privacy vectors (PVs) and trust vectors (TVs) between a mobile device and an authenticating entity.
FIG. 7 is a diagram illustrating privacy vector components and trust vector components.

With additional reference to FIG. 6, in one embodiment, local trust broker (TB) 220 of mobile device 100 may be configured to exchange one or more privacy vectors (PVs) and trust vectors (TVs) with authenticating entity 221 for authentication purposes. The PVs and TVs may be multi-field messages used to communicate credentials, authentication methods, user security/privacy preferences, information or data. In particular, the TV may comprise a multi-field data message including sensor data scores, biometric sensor information scores, user data input, or authentication information to match or satisfy the authentication request from the authenticating entity 221. The PVs may be used to communicate the availability of authentication information and/or to request the availability of authentication information. The TVs may be used to request or deliver specific authentication data, information and credentials. The TV may include one or more trust scores, trust coefficients, aggregated trust coefficients, authentication system output, or authentication information.

For example, as can be seen in FIG. 6, authenticating entity 221 may initiate a first PV request (e.g., original authentication request 217) to mobile device 100. The PV request 600 may include a request for authentication and additional data (e.g., authentication credentials, authentication methods, authentication data requests, etc.). This may include specific types of sensor data, biometric sensor information, user input data requests, user interface data, or authentication information requests. The PV request 600 may occur after an authentication request has been received by the mobile device 100 from the authenticating entity 221. Alternatively, an authentication request may be included with the PV request 600. Next, mobile device 100 may submit a PV response 605 to the authenticating entity 221. This may include the offer or availability of user authentication resources and additional data (e.g. authentication credentials, authentication methods, authentication data, user information, user credentials, or authentication information). Again these are the types of sensor data, biometric sensor information, user data input, or authentication information that match or satisfy predefined user security/privacy preferences and/or settings. Based upon this, the authenticating entity 221 may submit a TV request 610 to the mobile device 100. The TV request 610 may request authentication credentials, data requests (e.g. sensor data, biometric sensor information, user data input, etc.), and supply authentication parameters (e.g. methods, persistence, etc.). In response, mobile device 100 may submit a TV response 615 (e.g. authentication response 219). The TV response 615 may include authentication credentials, requested data (e.g. sensor data, biometric sensor information, user data input, one or more trust coefficients, authentication information, etc.), and authentication parameters (e.g. methods, persistence, etc.). It should be appreciated that the trust broker of the mobile device 100 may negotiate with the trust broker of the authenticating entity 221 to determine a TV response 615 that satisfies both the predefined user security/privacy preferences and the authentication requirements of the authenticating entity via this back and forth of PVs and TVs. Authentication parameters may include, for example, parameters provided by the authenticating entity that describe or otherwise determine which sensor inputs to acquire information from and how to combine the available sensor information. In some implementations, the authenticating parameters may include a scoring method and a scoring range required by the authenticating entity, how to calculate a particular trust score, how often to locally update the trust score, and/or how often to provide the updated trust score to the authenticating entity. A persistence parameter may include, for example, a number indicating the number of seconds or minutes in which a user is authenticated until an updated authentication operation is required. The persistence parameter may be, for example, a time constant in which the trust coefficient or trust score decays over time. The persistence parameter may be dynamic, in that the numerical value may change with time, with changes in location or behavior of the user, or with the type of content requested.

Thus, in one embodiment, the local trust broker 220 of the mobile device 100 may determine if the PV request 600 matches or satisfies predefined user security/privacy preferences and if so, the trust broker may retrieve, extract or otherwise receive the sensor data from the sensor, the biometric sensor information from the biometric sensor, the user data input, and/or authentication information that matches or satisfies the PV request 600. The mobile device 100 may then transmit the TV 615 to the authenticating entity 221 for authentication with the authenticating entity. However, if the PV request 600 does not match or otherwise not satisfy the predefined user security/privacy preferences, the local trust broker may transmit a PV response 605 to the authenticating entity 221 including predefined user security/privacy preferences having types of user-approved sensor data, biometric sensor information, user data input and/or authentication information. The authenticating entity 221 may then submit a new negotiated TV request 610 that matches or satisfies the request of the mobile device 100. In this way, the trust broker of the mobile device 100 may negotiate with the trust broker of the authenticating entity 221 to determine a TV that matches or satisfies the predefined user security/privacy preferences and that matches or satisfies the authentication requirements of the authenticating entity 221. In this way the PV and TV requests and responses may be used to exchange authentication requirements as well as other data.

In some examples, the PV is descriptive, for example, it may include examples of the form: "this is the type of information I want", or "this is the type of information I am willing to provide". Thus, the PV may be used to negotiate authentication methods before actual authentication credentials are requested and exchanged. On the other hand, the TV may be used to actually transfer data and may include statements of the form: "send me this information, using these methods" or "this is the information requested". In some examples, the TV and PV can be multi-parameter messages in the same format. For example, a value in a field in a PV may be used to indicate a request for or availability of a specific piece of authentication information. The same corresponding field in a TV may be used to transfer that data. As another example, a value of a field of the PV may be used to indicate availability of a particular sensor on a mobile device such as a fingerprint sensor, and a corresponding field in the TV may be used to transfer information about that sensor such as raw sensor data, sensor information, a trust score, a successful authentication result, or authentication information. In some examples, the TV may be used to transfer data in several categories as requested by the PV, for example 1) credentials that may be used to authenticate, e.g., user name, password, fingerprint matching score, or certificate; 2) ancillary authentication data such as specific authentication methods or an updated trust coefficient; 3) optional data such as location, contextual information, or other sensor data and sensor information that may be used in authentication, such as a liveness score or an anti-spoof score; and/or 4) parameters used to control the continuous authentication engine, such as sensor preferences, persistence, time constants, time periods, etc. In some examples, requests and responses may be at different levels and not always include individual identification (e.g., "is this a real human?", "is this device stolen?", "is this user X?", or "who is this user?"). According to some examples, various entities that may request authentication may each have their own respective, flexible authentication schemes, but the trust broker in negotiation using PVs and TVs allows the use of user security and privacy settings to negotiate data offered before the data is transmitted.

With additional reference to FIG. 7, examples of TV components 702 and PV components 704 will be described. In particular, a better understanding of the aforementioned features of the PVs and the TVs, according to some examples, may be seen with reference to FIG. 7. For example, various TV components 702 may be utilized. In this example, TV components 702: TC1; TC2; TC3 . . . TCn are shown. As examples, these components may form part or all of a multi-field data message. The components may be related to session information, user name, password, time/date stamp, hard biometrics, soft biometrics, hard geophysical location, soft geophysical location, authentication information, etc. These may include user data input, sensor data or information and/or scores from sensor data, as previously described in detail. Additionally, for inbound TVs from the authenticating entity there may be indications as to whether the component is absolutely required, suggested, or not at all required. For example, this may be a value from zero to one. As to outbound TVs from the mobile device to the authenticating entity, sensor fields may be included to indicate whether the specific sensors are present or not present (e.g. one or zero) as well as sensor data, sensor information, scoring levels, or scoring values. Such scoring values may be pass or not pass (e.g. one or zero) or they may relate to an actual score value (e.g. 0-100 or 0-255). Therefore, in some embodiments, the TV may contain specific authentication requests, sensor information or data, or other authentication information.

Further, the PV components 704 (e.g., PV components 704: PC1; PC2; PC3 . . . PCn) may describe the request for the availability of authentication devices or authentication information, and indicate permission (or denial) of the request to provide data or information associated with each device. For example, for inbound PVs from an authenticating entity to a mobile device, various fields may include required fields (e.g., 0 or 1), pass/fail (e.g., 0 or 1), values, level requirements, etc. For example, for outbound PVs from the mobile device to the authenticating entity, the fields may include available fields (e.g., 0 or 1), preferences, user-approved preferences or settings that can be provided (e.g., 0 or 1), enumeration of levels that can be provided, etc.

According to some examples, the TV may include a wide variety of different types of indicia of user identification/authentication. Examples of these may include session ID, user name, password, date stamp, time stamp, trust coefficients or trust scores based upon sensor device input from the previously described sensors, fingerprint template information, template information from multiple fingerprints, fingerprint matching score(s), face recognition, voice recognition, face location, behavior aspects, liveness, GPS location, visual location, relative voice location, audio location, relative visual location, altitude, at home or office, on travel or away, etc. Accordingly, these types of TV types may include session information, conventional authorization techniques, time/date, scoring of sensor inputs, hard biometrics, soft biometrics, hard geophysical information, soft geophysical information, etc. In some implementations, visual location may include input from a still or video camera associated with the mobile device, which may be used to determine the precise location or general location of the user, such as in a home office or out walking in a park. Hard geophysical information may include GPS information or video information that clearly identifies the physical location of the user. Soft geophysical information may include the relative position of a user with respect to a camera or microphone, general location information such as at an airport or a mall, altitude information, or other geophysical information that may fail to uniquely identify where a user is located.

It should be appreciated that a wide variety of TV components may be utilized with a wide variety of different types of sensor inputs and the TV components may include the scoring of those TV components. Additional examples may include one or more TV components associated with sensor output information for iris, retina, palm, skin features, cheek, ear, vascular structure, hairstyle, hair color, eye movement, gait, behavior, psychological responses, contextual behavior, clothing, answers to questions, signatures, PINs, keys, badge information, RFID tag information, NFC tag information, phone numbers, personal witness, and time history attributes, for example.

It should be appreciated that many of the trust vector components may be available from sensors that are installed on the mobile device, which may be typical or atypical dependent on the mobile device. Some or all of the sensors may have functionality and interfaces unrelated to the trust broker. In any event, an example list of sensors contemplated may include one or more of the previously described cameras, microphones, proximity sensors, IR sensors, gyroscopes, accelerometers, magnetometers, GPS or other geo-location sensors, barometric pressure sensors, capacitive touch screens, buttons (power/home/menu), heart rate monitor, fingerprint sensor or other biometric sensors (stand alone or integrated with a mouse, keypad, touch screen or buttons). It should be appreciated that any type of sensor may be utilized with aspects of the invention.

It should be appreciated that the local trust broker 220 of the mobile device 100 utilizing the various types of TVs and PVs may provide a wide variety of different functions. For example, the local trust broker may provide various responses to authentication requests from the authenticating entity 221. These various responses may be at various levels and may not always include individual identifications. For example, some identifications may be for liveness or general user profile. As to other functions, the local trust broker may be utilized to manage user credentials and manage authentication privacy. For example, functions controlled by the trust broker may include storing keys and credentials for specific authentication schemes, providing APIs to change user security/privacy settings in response to user security and privacy preferences, providing an appropriate response based on user security/privacy settings, interacting with a CAM/CAE, interacting with an authentication system, or not revealing personal identities or information to unknown requests. Local trust broker functionality may also provide responses in the desired format. For example, the TV may provide a user name/password or digital certificate in the desired format. The local trust broker functionality may also include managing the way a current trust coefficient value affects the device. For example, if the trust coefficient value becomes too low, the local trust value may lock or limit accessibility to the mobile device until proper authentication by a user is received. Trust broker functionality may include requesting the continuous authentication manager to take specific actions to elevate the trust score, such as asking the user to re-input fingerprint information. Furthermore, the trust broker functionality may include integrating with systems that manage personal data. For example, these functions may include controlling the release of personal information or authentication information that may be learned over time by a user profiling engine, or using that data to assist authentication requests. It should be appreciated that the previously described local trust broker 220 of the mobile device 100 may be configured to flexibly manage different types of authentication and private information exchanges. Requests and responses may communicate a variety of authentication-related data that can be generic, user specific, or authentication-method specific.

Figure 8:
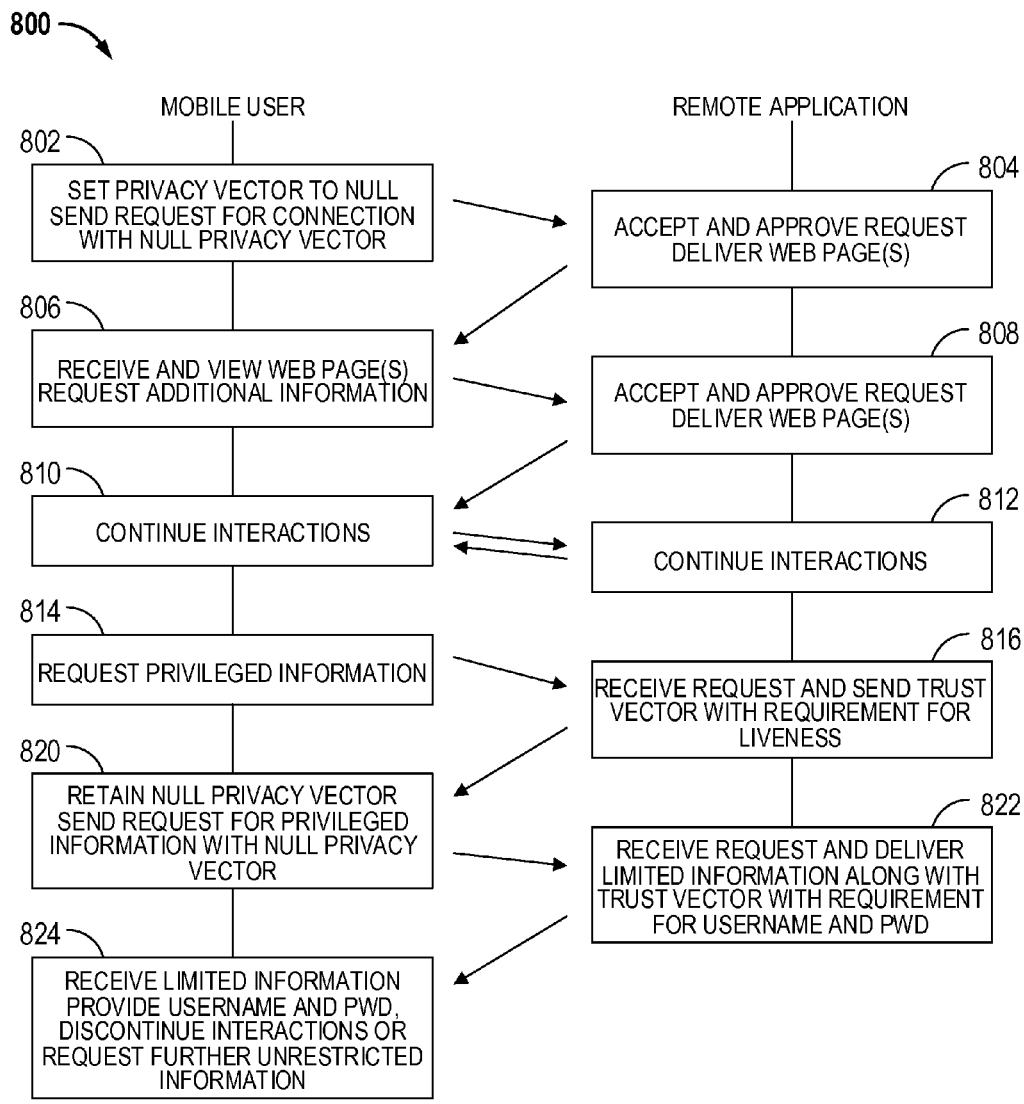
FIG. 8 is a flow diagram illustrating a use case scenario between a mobile user and a remote application.

Examples of authentication procedures utilizing trust brokers of the mobile device and authenticating entity, trust vectors (TVs), and privacy vectors (PVs) will be hereinafter described. For example, with reference to FIG. 8, a use case scenario is illustrated in which a mobile user accesses a remote application running on a commercial website for publically available information as an anonymous user or guest. In this example of a trust-broker interaction, the user utilizing the mobile device may initially access a commercial website without requiring authentication as a unique user. Communication or information flow may be limited if the PV is not upgraded to permit revealing more information about the user. For example, at block 802, the PV is set to null (indicating that no personal information or location information are available) and a request for connection is sent with a null PV. At block 804, the commercial website accepts and approves the request and delivers web pages to the mobile device, which may have limited information available for viewing. At block 806, the web pages are received and viewed and additional information is requested. At block 808, the commercial website accepts and approves the request and delivers the additional web pages. Continued interactions may proceed at the mobile device (block 810). Continued interactions may occur at the commercial website (block 812). At block 814, the mobile device may request privileged information. At block 816, the commercial website may receive the request and send a TV with the requirement for "liveness". At block 820, the mobile device may retain the null PV and may send a request for privileged information with a null PV. At block 822 the commercial website may receive the request and deliver limited information along with a TV requirement for a user name and a password. At block 824, the mobile device may receive the limited information, and then provide the user name and the password via a TV, discontinue interactions, or further request unrestricted information. Thus, FIG. 8 illustrates an anonymous user interaction with a website in which publically available information may be accessed, however, additional privileged information may require a TV with additional information.

Figure 9:
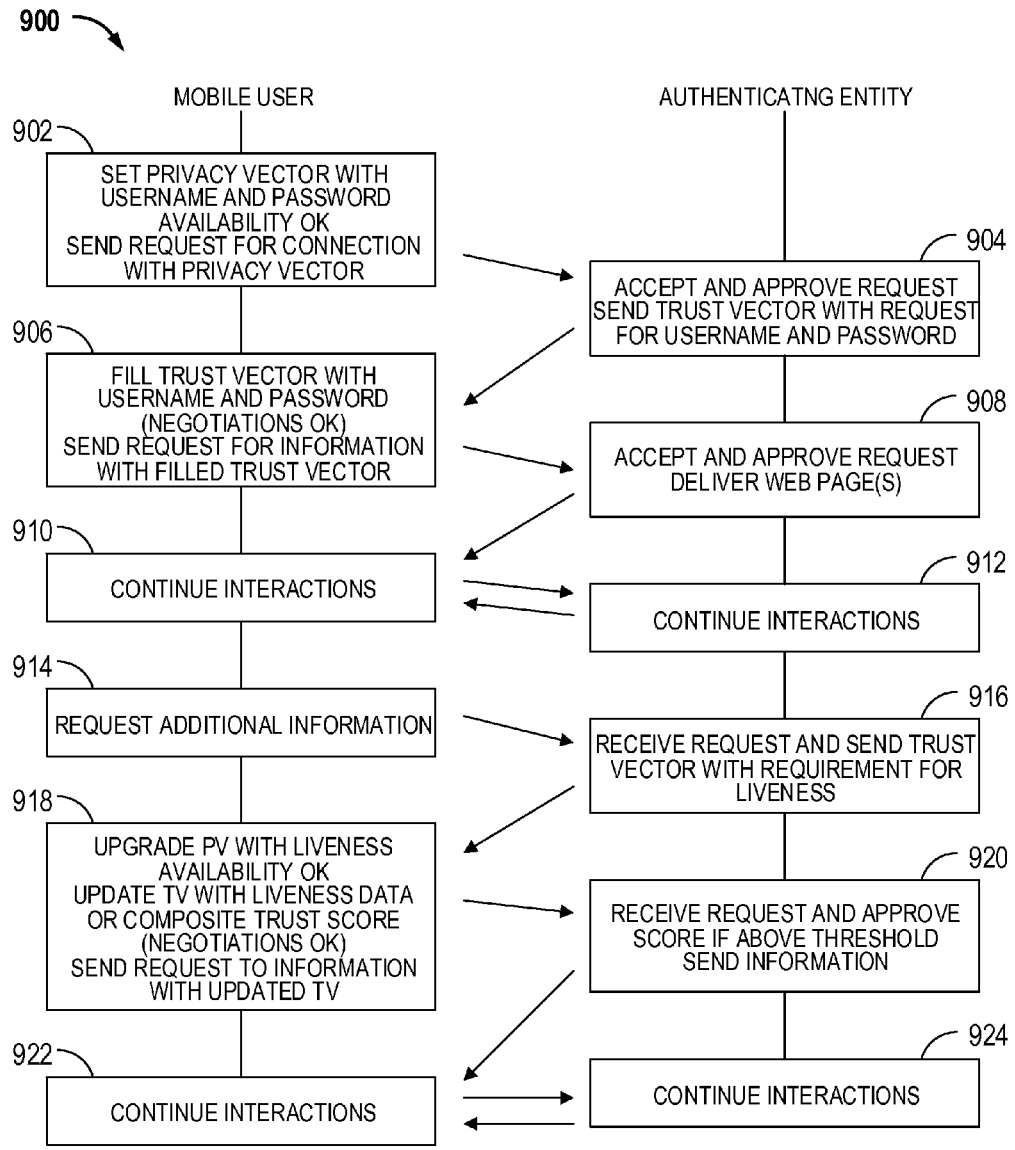
FIG. 9 is a flow diagram illustrating a use case scenario between a mobile user and an authenticating entity.

With additional reference to FIG. 9, a use case scenario is illustrated in which a user interacts with an authenticating entity such as a "legacy" website. A legacy website may be a website with which the user has previously enrolled or registered. As a result, the user may have a conventional login with a user name and password or PIN. In this scenario, the trust broker may facilitate the use of both unique and non-unique authentication information. The trust broker may interact with a website or application that can be accessed using conventional user-generated credentials such as a username and password or personal identification number (PIN), in addition to the use of data such as a liveness score that is not unique to a particular user, yet confirms that the user is real. In this example, the legacy website sends a TV request for "liveness" of the user (i.e. evidence for certification that the user is a real person) to continue the interactions. Exchanges between the user and the website may be stopped if the trust score based on user name, password, PIN, liveness or other authentication information falls below a predefined threshold. In particular, at block 902, a PV is set with the user name and password being acceptable and a request for connection is sent with the PV. At block 904, the website accepts and approves the request and sends a TV that requests the user name and password. At block 906 the TV is filled with the user name and password (e.g. negotiations are agreeable to the mobile user, the request for information is sent with the filled TV). At block 908, the website accepts and approves the request and delivers the requested web pages. At block 910, interactions continue. At block 912, interactions continue. At block 914, the mobile device requests additional information. At block 916, the website receives the request for additional information and sends a TV with a requirement for liveness. At block 918, the mobile device upgrades the PV with liveness availability OK (e.g., a sensor or method for liveness detection is available on the mobile device and the mobile user is agreeable to provide the result of the liveness detection to the authenticating entity), updates the TV with liveness data and/or a composite trust score, determines that negotiations are agreeable; and a request for information is sent with the updated TV. At block 920, the commercial website receives the request and approves the trust score if it is above a threshold and then sends the requested information. At block 922 and 924 interactions continue.

Figure 10:
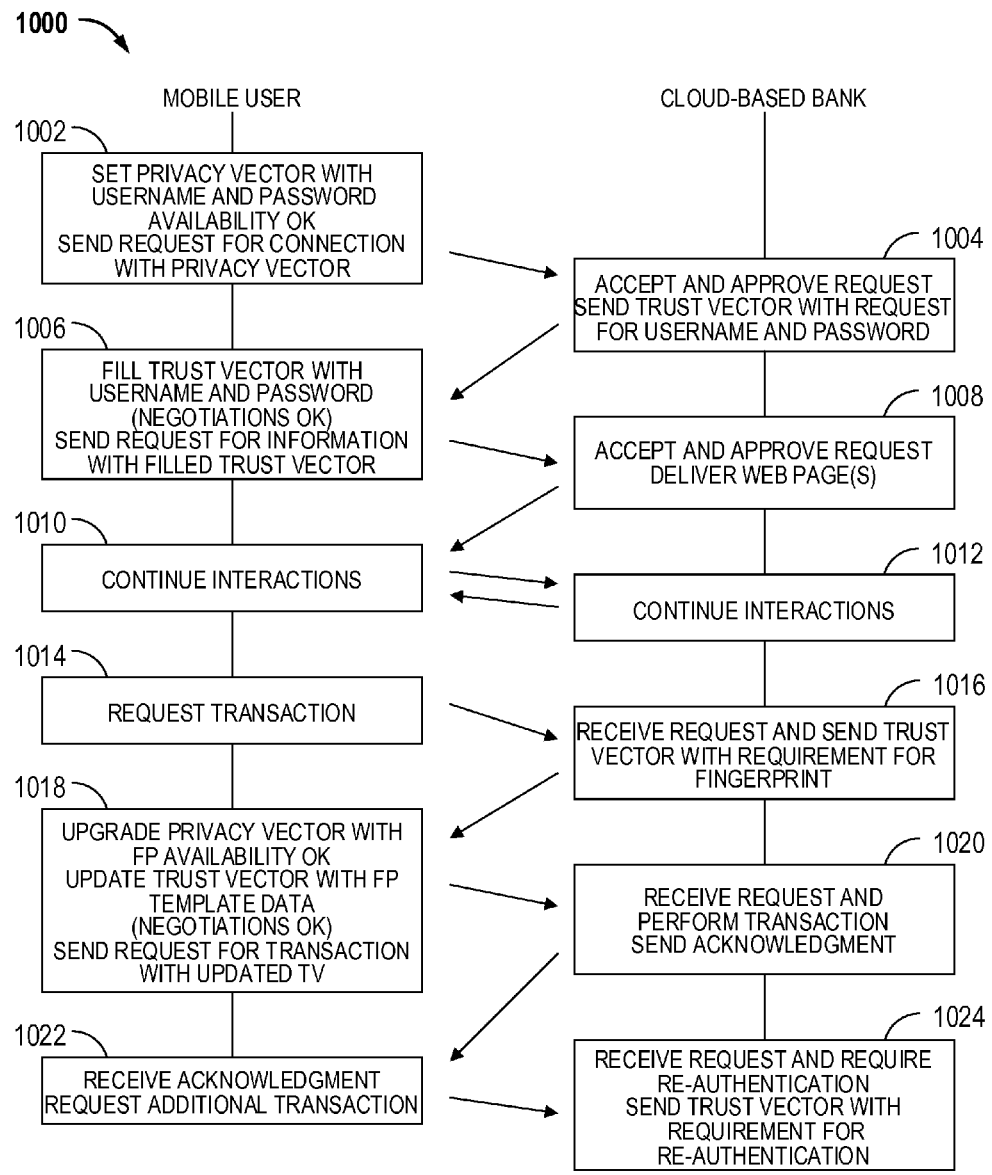
FIG. 10 is a flow diagram illustrating a use case scenario between a mobile user and an authenticating entity such as a cloud-based bank.

With reference to FIG. 10, a use case scenario is illustrated in which a user is seeking to engage in a mobile banking transaction with an authenticating entity such as a cloud-based bank. This scenario includes the use of multiple types of authentication inputs including traditional username/password and biometric information. In this illustrated example, it is assumed that the user has a prior enrollment or a previous registration with the website. The initial transaction to check an account is followed by a request to perform the transaction between subaccounts. In this example, the website requires an upgrade to the TV to include one or more acceptable credentials (such as a username and password, or a digital certificate) that may be released upon successful fingerprint authentication of the registered user. After a certain period of time or a certain number of additional transactions, the website may require additional authentication for additional transactions. At block 1002, the mobile device sets the PV with username and password availability being agreeable and sends a request for connection with the PV. At block 1004, the cloud-based bank accepts and approves the request and sends a TV with the request for the username and password. At block 1006, the mobile device fills a TV with the username and password (negotiations are agreeable) and sends the request for information with a filled TV. At block 1008, the cloud-based bank accepts and approves the request and delivers web pages. At block 1010 and block 1012, interactions continue. At block 1014, the mobile device requests a transaction. At block 1016 the cloud-based bank receives the request and sends a TV with the requirements for a fingerprint. At block 1018, the mobile device upgrades the PV with an affirmative on fingerprint availability, updates the TV with fingerprint information such as a fingerprint template or an indication that the fingerprint of the user matches a fingerprint template of an enrollee of the mobile device (negotiations are agreeable), and sends the request for a transaction with the updated TV. At block 1020, the cloud-based bank receives the request, performs the transaction, and sends an acknowledgement. At block 1022, the mobile device receives the acknowledgement and requests an additional transaction. At block 1024 the cloud-based bank receives the request, requires re-authentication, sends a TV with the requirement for re-authentication, and the process continues thereafter.

Figure 11:
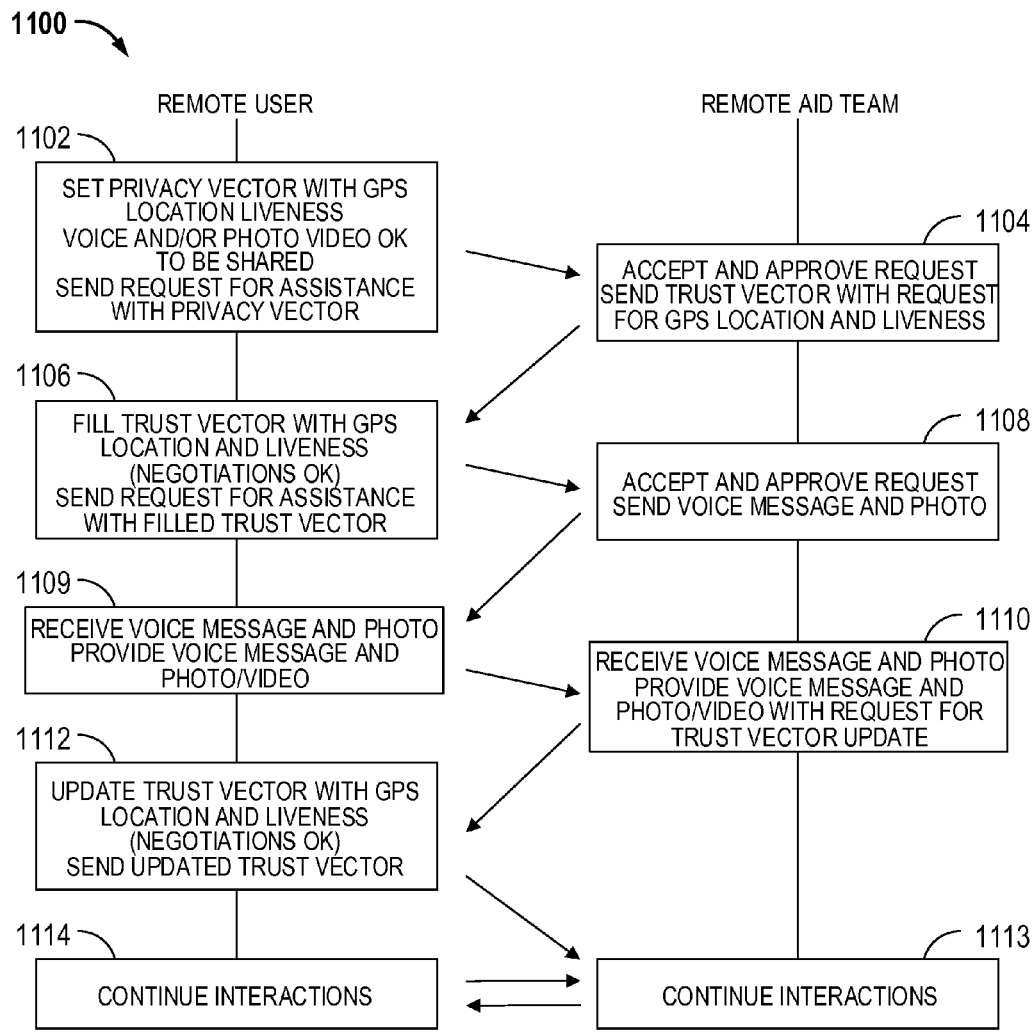
FIG. 11 is a flow diagram illustrating a use case scenario between a remote user and a remote aid team.

With reference to FIG. 11, a use case scenario is illustrated in which the user is seeking to interact with a remote medical provider. In this example, the trust brokers may exchange multiple types of non-unique authentication and ancillary sensor data. More particularly, this scenario assumes no prior enrollment or other relationship between the user and the care provider that might result, for example, in the case of an emergency, accident, or natural disaster. The interaction may be mobile to mobile or land-based, peer to peer, or person to person communications. The scenario of the remote user may allow GPS location, liveness, and voice identity to be shared with the medical care provider that may be, for example, a remote team (e.g., a physician and a coordinator). The remote aid team may allow GPS location, liveness, voice and video to be shared and constant updates of GPS location and liveness during communications to be exchanged. At block 1102, the mobile device may set the PV with an indication that GPS location, liveness, voice, and/or photo/video are available and willing to be shared, and a request may be sent for assistance with the PV. At block 1104, the remote aid team may accept and approve the request, send a TV with a request for GPS location and liveness. At block 1106, the mobile device may fill the TV with GPS location and liveness (negotiations are agreeable) and send the request for assistance with a filled TV. At block 1108, the remote aid team may accept and approve the request and send a voice message and a photo or live video. At block 1109, the mobile device may receive the voice message and photo or live video and may provide a voice message and a photo/video. At block 1110, the remote aid team may receive the voice message and photo/video and provide a voice message and photo/video with the request for a TV update. At block 1112, the mobile device may update the TV with the GPS location and liveness (negotiations are agreeable) and send an updated TV. Continued interactions may occur at blocks 1113 and 114.

Figure 12:
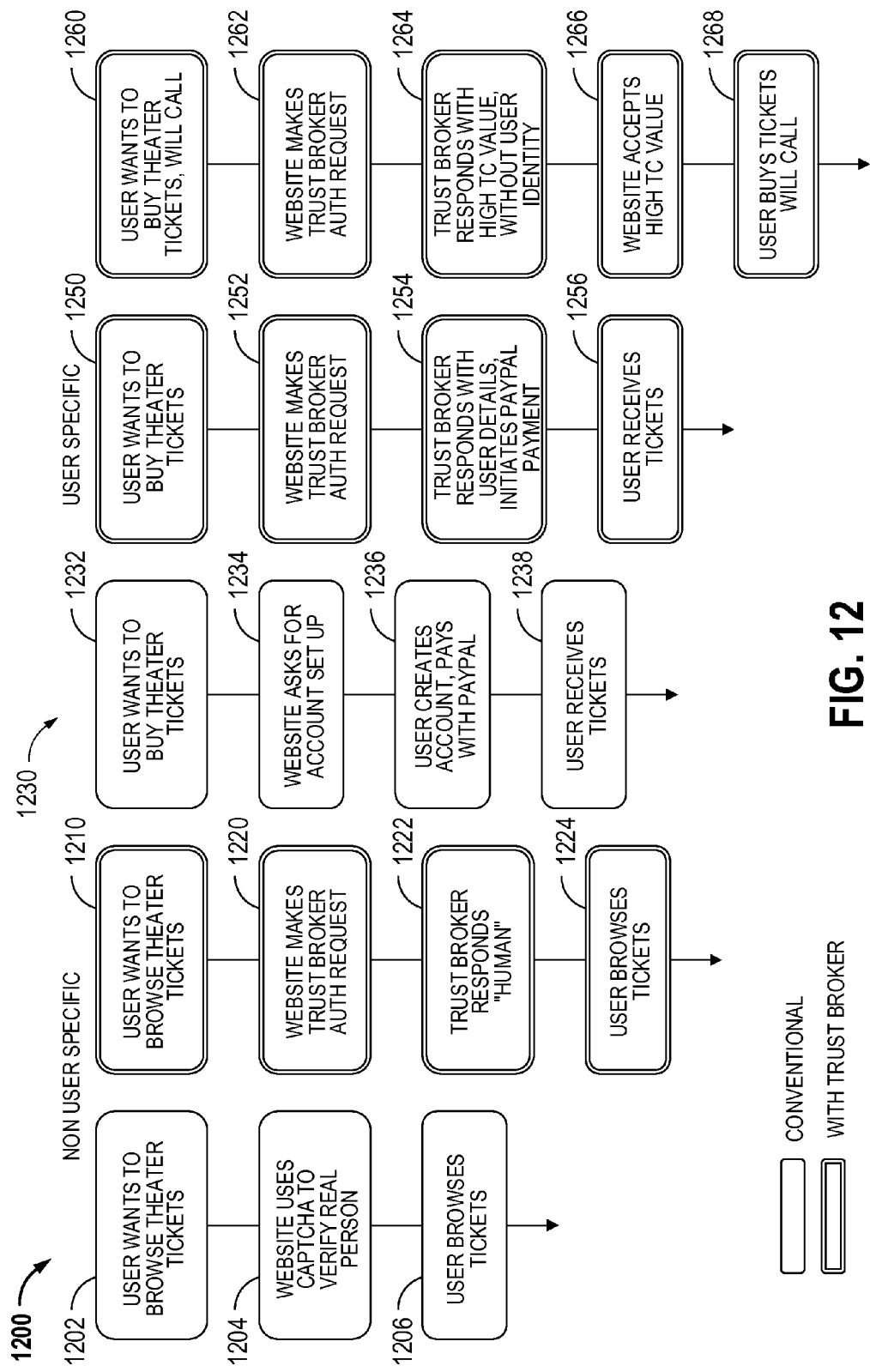
FIG. 12 is a flow diagram illustrating a use case scenario between a remote user and a website for the purchase of tickets.

FIG. 12 illustrates examples of non-user specific and user specific interactions. This illustration compares possible interactions with and without the use of a trust broker and with and without an exchange of unique authentication information. For example, a non-user specific example 1200 relates to a scenario where a user remains anonymous or the website requires authentication that the user is a person prior to allowing the user to engage in a browsing mode. In a conventional manner, the user may wish to browse theater tickets (block 1202), a website uses a CAPTCHA (a "completely automated public Turing test to tell computers and humans apart") to verify the user is a real person (block 1204), and the user may browse for tickets (block 1206). In a trust-broker manner, the user of a mobile device may want to browse theater tickets (block 1210), a website using the trust broker makes an authentication request (block 1220), the mobile device using a trust broker transmits an authentication response indicating "human" or otherwise provides sufficient information that the user may be deemed a human, and the user is allowed by the website to browse for tickets (block 1224).

As another example of conventional manner, a user may wish to buy theater tickets (block 1232), a website asks for an account set up (block 1234), the user creates an account and pays with PayPal (block 1236), and the user receives tickets (block 1238). In a trust-broker manner, the user wants to buy theater tickets (block 1250), the website makes a trust-broker authentication request (block 1252), a trust broker of the mobile device responds with user details and initiates PayPal payment (block 1254), and the user receives tickets (block 1256). As another example of a trust-broker manner, a user wants to buy theater tickets (will call) (block 1260), the website makes a trust-broker authentication request (block 1262), the trust broker of the mobile device responds with an authentication response with a trust vector having high trust scores and a high trust coefficient value without user identity (block 1264), the website accepts the trust vector with the high trust coefficient value (block 1266), and the user is allowed to procure the will call tickets (block 1268).

Figure 13:
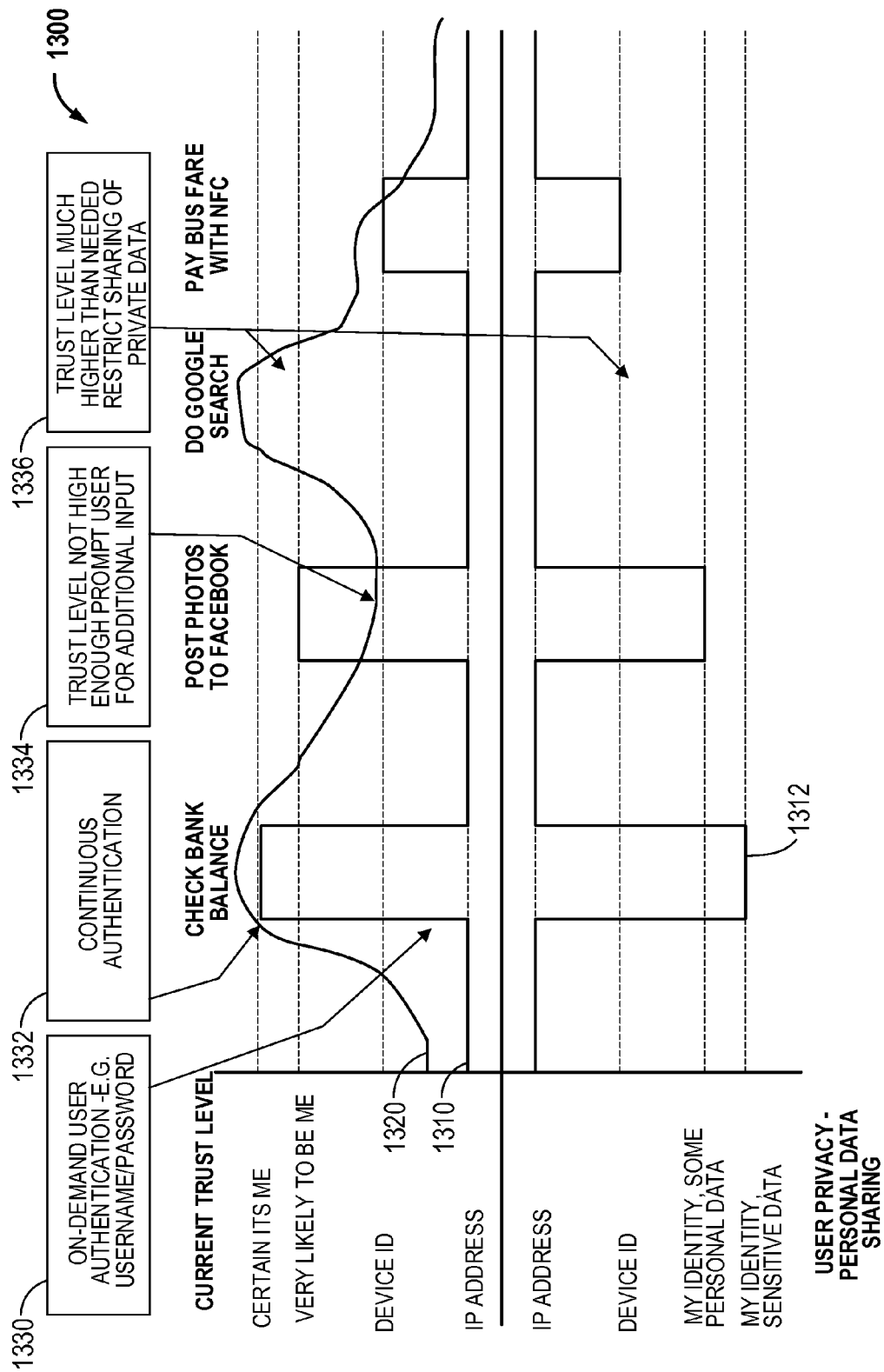
FIG. 13 is a graph illustrating a continuous authentication trust level that is continuously determined.

With brief reference to FIG. 13, a graph 1300 is illustrated in which a continuous authentication trust level 1320 may be continuously determined by the trust broker of the mobile device. It should be appreciated that the trust level may vary as a function of time and how the user interacts with the mobile device as to setting user privacy levels. Line 1312 illustrates user privacy as to the type of personal data that the user has allowed to be shared and line 1310 illustrates the current trust level based upon the user allowed data sharing. Various examples will be provided. For example, at scenario 1330, the user has provided on-demand user authentication (e.g., username/password) providing sensitive identity data bringing the trust level 1310 to "certain it's me" which brings the continuous authentication trust level 1320 (e.g., 1332) to a very high level to allow for such high security operations as checking a bank balance. After this, the user privacy 1312 is reduced to only the IP address and the continuous authentication trust level 1320 decreases such that if the user wants to post personal information on a social network (e.g., photos on FACEBOOK), the scenario 1334 has been changed to a point in which the trust level is not high enough and the user will be prompted to provide additional authentication information. However, once this additional input is provided, e.g. scenario 1336, the trust level may be too high for performing such items as searches (e.g., GOOGLE search) and the sharing of personal information may be restricted. With time, the continuous authentication trust level 1320 may decrease. In this example, the TB may be used to correctly match or satisfy the desired user privacy level with the required trust level. In the case of a Google search, the trust broker may use predetermined or predefined security/privacy settings to ensure only sufficient personal data is shared. In the case of a Facebook transaction, the TB may manage the process to negotiate and supply the needed TC or credentials to complete the transaction. However, subsequent actions, such as the user providing device ID (e.g., NFC ID) to pay for a bus fare still keeps the continuous authentication trust level 1320 at a suitable level to perform this function.

As previously described, a trust coefficient (TC) may be a value or level of trust based upon a composition of one or more inputs, such as user data inputs (e.g., username, password, etc.), sensor inputs (e.g., GPS location input, acceleration input, etc.), or biometric sensor inputs (e.g., fingerprint scan from a fingerprint sensor, facial scan from a camera, etc.). Some of these inputs may be given scores. An authenticating entity 221 may also set a risk coefficient (RC) that needs to be met to create, generate or otherwise form a trust level significant enough to allow for authentication of a mobile device 100. Therefore, the remote trust broker 222 of the authenticating entity 221 may determine whether a mobile device 100 has provided enough information (e.g., through the authentication response 219—and in particular, via one or more trust scores or TCs from the mobile device) to generate or accept a TC that is greater than the RC such that the authenticating entity 221 authenticates the mobile device 100. In particular, after negotiation between the authenticating entity 221 and mobile device 100, a suitable TV may be determined that may include one or more user data input, sensor data scores, biometric sensor information scores, as well as other data or authentication information, that is transmitted to the authenticating entity. If based upon the TV and in particular, the scores of the TV, the remote trust broker 222 of the authenticating entity 221 may determine that the TC is greater than the RC and the authenticating entity 212 may authenticate the mobile device 100.

In some implementations, the TB may be used in conjunction with continuous authentication (CA) techniques. For example, CA techniques disclosed in applicant's provisional application entitled "Continuous Authentication for Mobile Devices", application No. 61/943,435 filed Feb. 23, 2014, the disclosure of which is hereby incorporated by reference into the present application in its entirety for all purposes, may be utilized.

It should be appreciated that aspects of the invention previously described may be implemented in conjunction with the execution of instructions by one or more processors of the device. For example, processors of the mobile device and the authenticating entity may implement trust brokers and other embodiments, as previously described. Particularly, circuitry of the devices, including but not limited to processors, may operate under the control of a program, routine, or the execution of instructions to execute methods or processes in accordance with embodiments of the invention. For example, such a program may be implemented in firmware or software (e.g. stored in memory and/or other locations) and may be implemented by processors and/or other circuitry of the devices. Further, it should be appreciated that the terms processor, microprocessor, circuitry, controller, etc., refer to any type of logic or circuitry capable of executing logic, commands, instructions, software, firmware, functionality, etc.

It should be appreciated that when the devices are mobile or wireless devices, they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, CDMA, TDMA, OFDM, OFDMA, WiMAX, and WiFi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), a tablet computer, a mobile computer, a laptop computer, an entertainment device (e.g., a music or video device), a headset (e.g., headphones, an earpiece, etc.), a medical device (e.g., a biometric sensor, a heart rate monitor, a pedometer, an ECG device, etc.), a user I/O device, a computer, a wired computer, a fixed computer, a desktop computer, a server, a point-of-sale device, a set-top box, or any other suitable device. These devices may have different power and data requirements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal or mobile device. In the alternative, the processor and the storage medium may reside as discrete components in a user terminal or mobile device.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A mobile device comprising:
a transceiver;
a plurality of sensors; and
a processor configured to:
    transmit a request for a transaction to an authenticating entity through the transceiver;
    receive an authentication request from an authenticating entity requesting authentication information through the transceiver;
    determine if the authentication request satisfies predefined user privacy preferences, wherein the user privacy preferences are predefined based on the authenticating entity and the transaction, and, if so:
    retrieve the authentication information from at least one sensor to form a trust vector in response to the authentication request; and
    transmit the trust vector to the authenticating entity for authentication, wherein if the authentication request does not satisfy the predefined user privacy preferences based upon types of user-approved device specific sensor data and types of 1) biometric sensor information, and/or 2) data input, a trust broker to negotiate with the authenticating entity to determine the trust vector that satisfies the predefined user privacy preferences and the authentication requirements for the authenticating entity, and the trust broker to transmit the negotiated trust vector to the authenticating entity through the transceiver.

2. The mobile device of claim 1, wherein the trust broker determines at least one sensor data score, biometric sensor information score, or data input score for inclusion in the trust vector.

3. The mobile device of claim 1, wherein the trust vector includes a multi-field data message including at least one of sensor data, biometric sensor information, data input, a sensor data score, a biometric sensor information score, a data input score, a trust coefficient, a trust score, a credential, an authentication coefficient, an authentication score, an authentication level, an authentication system output, or authentication information to satisfy the authentication request.

4. The mobile device of claim 1, wherein one or more components of the trust vector are updated to provide continuous authentication.

5. A method to perform authentication with an authenticating entity comprising:
transmitting a request for a transaction to the authenticating entity through a transceiver;
receiving an authentication request from the authenticating entity requesting authentication information through the transceiver;
determining if the authentication request satisfies predefined user privacy preferences, wherein the user privacy preferences are predefined based on the authenticating entity and the transaction, and, if so:
retrieving the authentication information to form a trust vector in response to the authentication request; and
transmitting the trust vector to the authenticating entity for authentication, wherein if the authentication request does not satisfy the predefined user privacy preferences based upon types of user-approved device specific sensor data and types of 1) biometric sensor information, and/or 2) data input, a trust broker to negotiate with the authenticating entity to determine the trust vector that satisfies the predefined user privacy preferences and the authentication requirements for the authenticating entity, and the trust broker to transmit the negotiated trust vector to the authenticating entity through the transceiver.

6. The method of claim 5, further comprising determining at least one sensor data score, biometric sensor information score, or data input score for inclusion in the trust vector.

7. The method of claim 5, wherein the trust vector includes a multi-field data message including at least one of sensor data, biometric sensor information, data input, a sensor data score, a biometric sensor information score, a data input score, a trust coefficient, a trust score, a credential, an authentication coefficient, an authentication score, an authentication level, an authentication system output, or authentication information to satisfy the authentication request.

8. The method of claim 5, further comprising updating the trust vector to provide continuous authentication.

9. A non-transitory computer-readable medium including code that, when executed by a processor, causes the processor to:
transmit a request for a transaction to an authenticating entity through a transceiver;
receive an authentication request from an authenticating entity requesting authentication information through the transceiver;
determine if the authentication request satisfies predefined user privacy preferences, wherein the user privacy preferences are predefined based on the authenticating entity and the transaction, and, if so:
retrieve the authentication information to form a trust vector in response to the authentication request; and
transmit the trust vector to the authenticating entity for authentication, wherein if the authentication request does not satisfy the predefined user privacy preferences based upon types of user-approved device specific sensor data and types of 1) biometric sensor information, and/or 2) data input, a trust broker to negotiate with the authenticating entity to determine the trust vector that satisfies the predefined user privacy preferences and the authentication requirements for the authenticating entity, and the trust broker to transmit the negotiated trust vector to the authenticating entity through the transceiver.

10. The computer-readable medium of claim 9, further comprising code to determine at least one sensor data score, biometric sensor information score, or data input score for inclusion in the trust vector.

11. The computer-readable medium of claim 9, wherein the trust vector includes a multi-field data message including at least one of sensor data, biometric sensor information, data input, a sensor data score, a biometric sensor information score, a data input score, a trust coefficient, a trust score, a credential, an authentication coefficient, an authentication score, an authentication level, an authentication system output, or authentication information to satisfy the authentication request.

12. The computer-readable medium of claim 9, further comprising code to update the trust vector to provide continuous authentication.

13. A mobile device comprising:
means for transmitting a request for a transaction to an authenticating entity;
means for receiving an authentication request from an authenticating entity requesting authentication information;
means for determining if the authentication request satisfies predefined user privacy preferences, wherein the user privacy preferences are predefined based on the authenticating entity and the transaction, and, if so:
means for retrieving the authentication information to form a trust vector in response to the authentication request; and
means for transmitting the trust vector to the authenticating entity for authentication, wherein, if the authentication request does not satisfy the predefined user privacy preferences based upon types of user-approved device specific sensor data and types of 1) biometric sensor information, and/or 2) data input, utilizing means for negotiating with the authenticating entity to determine the trust vector that satisfies the predefined user privacy preferences and the authentication requirements for the authenticating entity, and utilizing the means for transmitting the negotiated trust vector to the authenticating entity.

14. The mobile device of claim 13, further comprising means for determining at least one sensor data score, biometric sensor information score, or data input score for inclusion in the trust vector.

15. The mobile device of claim 13, wherein the trust vector includes a multi-field data message including at least one of sensor data, biometric sensor information, data input, a sensor data score, a biometric sensor information score, a data input score, a trust coefficient, a trust score, a credential, an authentication coefficient, an authentication score, an authentication level, an authentication system output, or authentication information to satisfy the authentication request.

16. The mobile device of claim 13, further comprising means for updating the trust vector to provide continuous authentication.

* * * * *

UNITED STATES PATENT AND TRADEMARK OFFICE
CERTIFICATE OF CORRECTION

PATENT NO. : 10,032,008 B2
APPLICATION NO. : 14/523679
DATED : July 24, 2018
INVENTOR(S) : Griffiths et al.

Page 1 of 1

It is certified that error appears in the above-identified patent and that said Letters Patent is hereby corrected as shown below:

On the Title Page

Item (72) should be corrected to read:
(72) Inventors: Jonathan Griffiths, Fremont, CA (US); Eliza Yingzi Du, Cupertino, CA (US); David William Burns, San Jose, CA (US); Muhammed Sezan, Los Gatos, CA (US)

Signed and Sealed this
Fourth Day of December, 2018

Andrei Iancu
*Director of the United States Patent and Trademark Office*